US009443152B2

(12) United States Patent
Atsmon et al.

(10) Patent No.: US 9,443,152 B2
(45) Date of Patent: Sep. 13, 2016

(54) AUTOMATIC IMAGE CONTENT ANALYSIS METHOD AND SYSTEM

(75) Inventors: Alon Atsmon, Greenwich, CT (US); Dan Atsmon, Rehovot (IL); Ram Dayan, Tel-Aviv (IL); Hilla Bass, Ramat-Gan (IL)

(73) Assignee: iOnRoad Technologies Ltd., Ramat-Gan (IL)

( * ) Notice: Subject to any disclaimer, the term of this patent is extended or adjusted under 35 U.S.C. 154(b) by 304 days.

(21) Appl. No.: 14/115,302

(22) PCT Filed: May 3, 2012

(86) PCT No.: PCT/IL2012/000182
§ 371 (c)(1),
(2), (4) Date: Jan. 9, 2014

(87) PCT Pub. No.: WO2012/150591
PCT Pub. Date: Nov. 8, 2012

(65) Prior Publication Data
US 2014/0111647 A1    Apr. 24, 2014

Related U.S. Application Data

(60) Provisional application No. 61/481,742, filed on May 3, 2011, provisional application No. 61/545,341, filed on Oct. 10, 2011, provisional application No. 61/548,259, filed on Oct. 18, 2011, provisional (Continued)

(51) Int. Cl.
*H04N 7/18*       (2006.01)
*G06K 9/00*       (2006.01)
(Continued)

(52) U.S. Cl.
CPC ........... *G06K 9/00791* (2013.01); *B60R 11/04* (2013.01); *G01C 21/34* (2013.01);
(Continued)

(58) Field of Classification Search
CPC .... H04N 7/181; H04N 5/2252; H04N 7/185; G06K 9/00791; G06K 9/00798; G06K 9/00825; G01C 21/34; G01C 21/26; G01C 21/3667
USPC ........................................................ 348/148
See application file for complete search history.

(56) References Cited

U.S. PATENT DOCUMENTS

| 6,370,475 B1 * | 4/2002 | Breed | B60N 2/2863 340/436 |
| 6,526,335 B1 * | 2/2003 | Treyz | G01C 21/26 307/10.1 |

(Continued)

OTHER PUBLICATIONS

European Patent Office, Communication Pursuant to Article 94(3) EPC Issued in Application No. 12731740.2, Sep. 29, 2014, Germany, 3 pages.

(Continued)

*Primary Examiner* — Sath V Perungavoor
*Assistant Examiner* — Nathnael Aynalem
(74) *Attorney, Agent, or Firm* — Alleman Hall McCoy Russell & Tuttle LLP

(57) ABSTRACT

A system and method for analyzing and wirelessly transmitting information in real-time, comprising capturing snapshots and videos, by utilizing for example a smartphone. The images are analyzed in conjunction with other system data to provide the user: 3 dimensional images, GPS coordinates, safety alerts, etc. In particular, the system is mountable within a vehicle interior to provide: road conditions, dangerous driving situations, the make/model/manufacturer of surrounding cars, GPS coordinates, and the identity of local businesses. The user may also share the information via wireless transmissions with surrounding users possessing the same system, such as for real-time video gaming systems. And the system may also be detached from the vehicle for use in other scenarios, such as searching a merchant database for matching items and wirelessly sending the information to other system users.

24 Claims, 26 Drawing Sheets

Related U.S. Application Data application No. 61/560,923, filed on Nov. 17, 2011, provisional application No. 61/577,033, filed on Dec. 18, 2011, provisional application No. 61/612,322, filed on Mar. 18, 2012.

(51) Int. Cl.
*G01C 21/36* (2006.01)
*B60R 11/04* (2006.01)
*G01C 21/34* (2006.01)
*H04N 5/225* (2006.01)
*H04N 21/214* (2011.01)

(52) U.S. Cl.
CPC ....... *G01C21/3647* (2013.01); *G06K 9/00221* (2013.01); *G06K 9/00798* (2013.01); *G06K 9/00825* (2013.01); *G06K 9/00832* (2013.01); *H04N 5/2252* (2013.01); *H04N 7/181* (2013.01); *H04N 7/185* (2013.01); *H04N 21/2146* (2013.01)

(56) References Cited

U.S. PATENT DOCUMENTS

| | | | | |
|---|---|---|---|---|
| 6,570,609 B1* | 5/2003 | Heien | ..................... | H04N 7/181 348/148 |
| 7,761,544 B2* | 7/2010 | Manasseh | ............... | G07C 5/008 709/223 |
| 2003/0025793 A1* | 2/2003 | McMahon | ............. | H04N 7/181 348/148 |
| 2004/0148090 A1* | 7/2004 | Melen | ..................... | G01C 21/26 701/482 |
| 2005/0183016 A1* | 8/2005 | Horiuchi | ........... | G06F 17/30802 715/719 |
| 2006/0220904 A1* | 10/2006 | Jarlengrip | ............. | B62D 15/029 340/901 |
| 2007/0139182 A1* | 6/2007 | O'Connor | ............. | G08B 27/006 340/521 |
| 2007/0204042 A1* | 8/2007 | Noble | ..................... | G06F 21/42 709/225 |
| 2007/0250901 A1* | 10/2007 | McIntire | ............ | H04N 7/17318 725/146 |
| 2008/0243312 A1* | 10/2008 | Nakamura | ............. | G01C 21/26 701/1 |
| 2009/0005929 A1* | 1/2009 | Nakao | ....................... | B60T 7/22 701/33.4 |
| 2009/0225189 A1* | 9/2009 | Morin | .................... | H04N 5/345 348/229.1 |
| 2010/0030582 A1* | 2/2010 | Rippel | .................... | G06Q 40/08 705/4 |
| 2010/0245093 A1* | 9/2010 | Kobetski | ................. | A61B 5/18 340/576 |
| 2010/0253598 A1* | 10/2010 | Szczerba | ............... | G01S 13/723 345/7 |
| 2011/0022301 A1* | 1/2011 | Lee | ......................... | G01C 21/26 701/533 |
| 2011/0143707 A1* | 6/2011 | Darby, Jr. | .......... | G06F 17/30265 455/404.2 |

OTHER PUBLICATIONS

European Patent Office, International Preliminary Report on Patentability of PCT/IL2012/000182, WIPO, Nov. 14, 2013, 6 pages.
European Patent Office, International Search Report and Written Opinion of PCT/IL2012/000182, Jan. 21, 2013, WIPO, 8 pages.

* cited by examiner

AUTOMATIC IMAGE CONTENT ANALYSIS METHOD AND SYSTEM

CROSS REFERENCE TO RELATED APPLICATIONS

The present application is the U.S. National Phase of International PCT Application Serial No. PCT/IL2012/000182, entitled "Automatic Content Analysis Method and System," filed May 3, 2012, which claims priority to U.S. Provisional Applications: 61/481,742 filed May 3, 2011; 61/545,341 filed Oct. 10, 2011; 61/548,259 filed Oct. 18, 2011; 61/560,923 filed Nov. 17, 2011; 61/577,033 filed Dec. 18, 2011; and No. 61/612,322 filed Mar. 18, 2012. The present application incorporates the foregoing disclosures herein by reference.

BACKGROUND

1. Technical Field

The present invention relates to image and video processing and more particularly, to such processing based on time-based changes.

2. Discussion of the Related Art

Using images of scenes taken on different time slots is a well-known method to detect, classify, and analyze changes to the scene or specific objects contained therein. Changes analysis may have further applications that may vary, according to the scope of the time-space that is being monitored.

The introduction of ubiquitous cellular communication devices equipped with imaging capabilities, some with positioning means, poses a challenge for a system and method for controlling these devices in an efficient manner for configuring them for object analysis that is changes based on one hand and has a wide span of applications, on the other hand.

BRIEF SUMMARY

One aspect of the invention provides a method of analyzing images over time. The method includes: capturing a plurality of images each associated with specified objects in specified locations such that a specified area is covered; specifying regions of interest (ROI) in each of the captured images; repeating the capturing with at least one of: a different location, a different orientation, and a different timing such that the captured images are associated with the specified covered area; and comparing the captured imaged produced in the capturing with the captured imaged produced in the repeating of the capturing to yield comparison between the captured objects by comparing specified ROI.

Other aspects of the invention may include a system arranged to execute the aforementioned methods and a computer readable program configured to execute the aforementioned methods. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
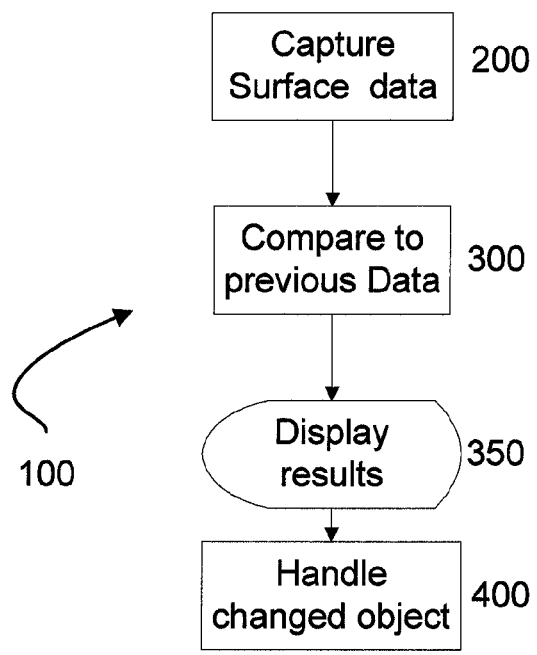
FIG. 1 is a flowchart of acts performed in accordance with an exemplary embodiment of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

To facilitate understanding the present invention, the following glossary of terms is provided. It is to be noted that terms used in the specification but not included in this glossary are considered as defined according the normal usage of the computer science art, or alternatively according to normal dictionary usage.

Glossary of Terms

The term "DB" as used herein in this application, is defined as database.

The term "GIS" as used herein in this application, is defined as a computer system designed to allow users to collect and/or manage and/or analyze spatially referenced information.

The term "surface objects" as used herein in this application, is defined as objects that are on the surface of a planet such as buildings, roads, canals, and fields.

The term "surface data" as used herein in this application is defined as information gathered on surface objects such as aerial images, satellite images, ground images, and images taken with a handheld camera or camera-phone, GIS information, LIDAR data, and Radar scans.

The term "image" as used herein in this application is defined as visual representation that can be presented on two dimensional or three dimensional surfaces. Images can be taken in any part of the electromagnetic spectrum such as visible light, infrared, ultraviolet, X-rays, Terahertz, Microwaves, and Radio frequency waves. An image could be taken from one or more sensors, or with one sensor with multiple lenses in order to create a 3 dimensional image.

The term "photo" as used herein in this application is defined as an image in the visible light.

The term "DSM" as used herein in this application, is defined as a topographic elevation model of the Earth surface that provides a geometrically representation for the purpose of overlaying the model with a wide range of GIS data. DSM provides a surface elevation of every natural and artificial feature visible within the image area.

The term "DEM" as used herein in this application, is defined as a digital representation of a continuous variable over a two-dimensional surface by a regular array of z values referenced to a common datum.

The term "DTM" as used herein in this application, is defined as Digital Terrain Model that is a 3D representation of the Earth's surface. Its construction includes a height model (DEM) and overlaid with map data relating to features on the surface (Map Data or Aerial Photograph).

The term "INS" as used herein in this application, is defined as a navigation aid that uses a computer, motion sensors (accelerometers) and rotation sensors (gyroscopes) to continuously calculate via dead reckoning the position, orientation, and velocity (direction and speed of movement) of a moving object without the need for external references.

The term "GPS" as used herein in this application, is defined as a system based on satellites that allows a user with a receiver to determine precise coordinates for their location on the Earth's surface.

The term "Micro navigation" as used herein in this application, is defined as a method based on visual objects that allows a user to determine precise coordinates for their location on the Earth's surface to a precision that is higher than of a GPS system.

The term "Real Time Map" as used herein in this application, is defined as a Map having a layer that is updated in a latency that is lower than the latency needed to benefit from the map considering the changes in the layer. For example a real time traffic jam map is a map that is updated for at least the last hour as that jam might be gone in an hour.

The term "GPU" as used herein in this application, is defined as an apparatus adapted to reduce the time it takes to produce images on the computer screen by incorporating its own processor and memory, having more than 16 CPU cores, such as GeForce 8800.

The term "Keypoint" as used herein in this application, is defined as interest points in an object. For example, in the SIFT framework, the image is convolved with Gaussian filters at different scales, and then the difference of successive Gaussian- blurred images are taken. Keypoints are then taken as maxima/minima of the Difference of Gaussians. Such keypoint can be calculated for the original image or for a transformation of the original image such as an affine transform of the original images.

The term "Keypoint descriptor" as used herein in this application, is defined as a descriptor of a key point. For example, in the SIFT framework the feature descriptor is computed as a set of orientation histograms on neighborhoods. The orientation histograms are relative to the keypoint orientation and the orientation data comes from the Gaussian image closest in scale to the keypoint's scale. Just like before, the contribution of each pixel is weighted by the gradient magnitude, and by a Gaussian with a 1.5 times the scale of the keypoint. Histograms contain 8 bins each, and each descriptor contains an array of 4 histograms around the keypoint. This leads to a SIFT feature vector with (4×4×8=128 elements).

The term "Visual content item" as used herein in this application, is defined as an object with visual characteristics such as an image file like BMP, JPG, JPEG, GIF, TIFF, PNG files; a screenshot; a video file like AVI, MPG, MPEG, MOV, WMV, FLV files or a one or more frame of a video.

The term LIDAR as used herein in this application is defined as is an optical remote sensing technology that measures properties of scattered light to find range and/or other information of a distant target. The prevalent method to determine distance to an object or surface is to use laser pulses.

The term "Visual object" as used herein in this application, is defined as a content that includes visual information such as Visual content item, images, photos, videos, IR image, magnified image, an image sequence or TV broadcast.

The term "Mobile device" as used herein in this application, is defined as a mobile computing device which may include but is not limited to a cellular phone, smart phone, GPS navigation unit, laptop, tablet and smart watch.

The term "Crowd sourced task" as used herein in this application, is defined as task contributed by a large undefined large group of people through a public data network.

The term "Like button" as used herein in this application, is defined as a button lets a user share his content with friends on a social network. For example when the user clicks the Like button on a website, a story appears in the user's friends' News Feed with a link back to the website.

The term "Camera" as used herein in this application is defined as means of capturing a visual object.

The term "Detachable camera" as used herein in this application is defined as means of capturing a visual object which is not an integrated part of a device. The detachable camera may be connected to a device using a wire with a protocol such as USB, and/or wirelessly with protocols such as Wi-Fi or Bluetooth.

The term "Detachable microphone" as used herein in this application is defined as means of capturing an audio signal which is not an integrated part of a device. The detachable microphone may be connected to a device using a wire with a protocol such as USB, and/or wirelessly with protocols such as Wi-Fi or Bluetooth.

The term "Terminal" as used herein in this application, is defined as an apparatus adapted to show visual content such as a computer, a laptop computer, Mobile phone or a TV.

The term "Visual similarity" as used herein in this application, is defined as the measure of resemblances between two visual objects that can be comprised of: the fit between their color distributions such as the correlation between their HSV color histograms; the fit between their texture; the fit between their shapes; the correlation between their edge histograms; Face similarity; and methods that include local descriptors and/or keypoints such as SIFT, ASIFT, SURF and MSR.

The term "Visual analysis" as used herein in this application, is defined as the analysis of the characteristics of visual objects such, as visual similarity, coherence, hierarchical organization, concept load or density, feature extraction and noise removal.

The term "Sound analysis" as used herein in this application, is defined as the analysis of audio waves such as speech recognition, song recognition, and sentiment recognition.

The term "Text similarity" as used herein in this application, is defined as a Measure of the pair-wise similarity of strings. Text similarity can score the overlaps found between two strings based on text matching. Identical strings will have a score of 100% while "car" and "dogs" will have close to zero score. "Nike Air max blue" and Nike Air max red" will have a score which is between the two.

The term "Regular expression" as used herein in this application, is defined as a string that provides a concise and flexible means for identifying strings of text of interest, such as particular characters, words, or patterns of characters.

The term "Text analysis" as used herein in this application, is defined as the analysis of the structural characteristics of text, as text similarity, coherence, hierarchical organization, concept load or density. Text analysis can use regular expressions.

The term "LPR" as used herein in this application, is defined as license plate recognition.

The term "OCR" as used herein in this application, is defined as the electronic identification and digital encoding of printed or handwritten characters by means of an optical scanner and specialized software.

The term "Symbol analysis" as used herein in this application, is defined as analysis of symbolic data such as: OCR, LPR, hand write recognition, bar-code recognition, and QR code recognition.

The term "Capturing data" as used herein in this application, is defined as data taken while capturing a visual object such as: X-Y-Z coordinates; 3 angles; Manufacturer; Model; Orientation (rotation) top-left; Software; Date and Time; YCbCr Positioning centered; Compression; x-Resolution; y-Resolution; Resolution Unit; Exposure Time; FNumber; Exposure Program; Exif Version; Date and Time (original); Date and Time (digitized); Components Configuration Y Cb Cr—; Compressed Bits per Pixel; Exposure Bias; Max Aperture Value; Metering Mode Pattern; Flash fired or not; Focal Length; Maker Note; Flash Pix Version; Color Space; Pixel X Dimension; Pixel Y Dimension; File Source; Interoperability Index; Interoperability Version; and/or derivatives of the above such as acceleration in the X-axis.

The term "Capturing data analysis" as used herein in this application, is defined as the analysis of Capturing data.

The term "Service location" as used herein in this application, is defined as a physical place where objects can be serviced and/or fixed such as a mobile carrier service center.

The term "Location based analysis" as used herein in this application, is defined as analysis of local data such as GPS location, triangulation data, RFID data, and street address. Location data can for example identify the service location or even the specific part of the service location in which the visual object was captured.

The term "Content analysis" as used herein in this application, is defined as the combination of text analysis, visual analysis, symbol analysis, location based analysis, Capturing data analysis, sound analysis and/or analysis of other data such as numerical fields (price range), date fields, logical fields (Female/male), arrays and structures, and analysis history.

The term "Content Match" as used herein in this application, is defined as a numerical value that describes the results of the content analysis that computes the similarity between one or more visual objects, or a logical value that is true in case said similarity is above a certain threshold.

The term "Data Clustering methods" as used herein in this application, is defined as the assignment of objects into groups (called clusters) so that objects from the same cluster are more similar to each other than objects from different clusters. Often similarity is assessed according to a distance measure.

The term "Driver warning" as used herein in this application, is defined as a warning comprising: an audio alert such as a beep sound; a visual alert such as a red light and/or a text such as: "stop", "slow down", "approaching destination", "pedestrian are crossing", "crossing border"; and a tactile feedback such as vibrations.

The term "Driving intervention" as used herein in this application, is defined as automatic driving operation such as: Braking; Slowing down; Complete stop; Taking a right turn; Taking a left turn; Turning lights on; and Tightening the seat belt.

The term "Server reaction" as used herein in this application, is defined as an action performed on a remote server such as sending a message such as an SMS to a specific person or sending a team to a specific location.

The term "System reaction" as used herein in this application, is defined as a driver warning, a driving intervention or combination of them.

Detailed Description

FIG. 1 is a flowchart of acts performed in accordance with an exemplary embodiment of the invention wherein System 100 performs the following steps. Surface data is captured 200 in manner further described in FIG. 2. Optionally, the Surface data is compared 300 to surface data taken or created at an earlier time. And the difference results are presented 350 as further described in FIG. 3.

In case changes are detected, then further actions 400 can be taken such as: 1) ordering system 222 (e.g. a plane) to capture another image of the changed object by taking: an Enlarged image; a Closer image; an Oblique(diagonal); a n image of different modality than the original one such as IR; an image in case a visible range image was originally taken; and/or the same image to verify the change; 2) Monitoring system 200 by reporting an abnormal number of changes; and/or 3) Performing an onsite manned or unmanned inspection of the object from the ground to further check/verify reported changes. This will be more beneficial in case comparison is taken in "real time" such as a time short enough to perform action 400 in the same session (e.g. the same flight session).

Figure 2:
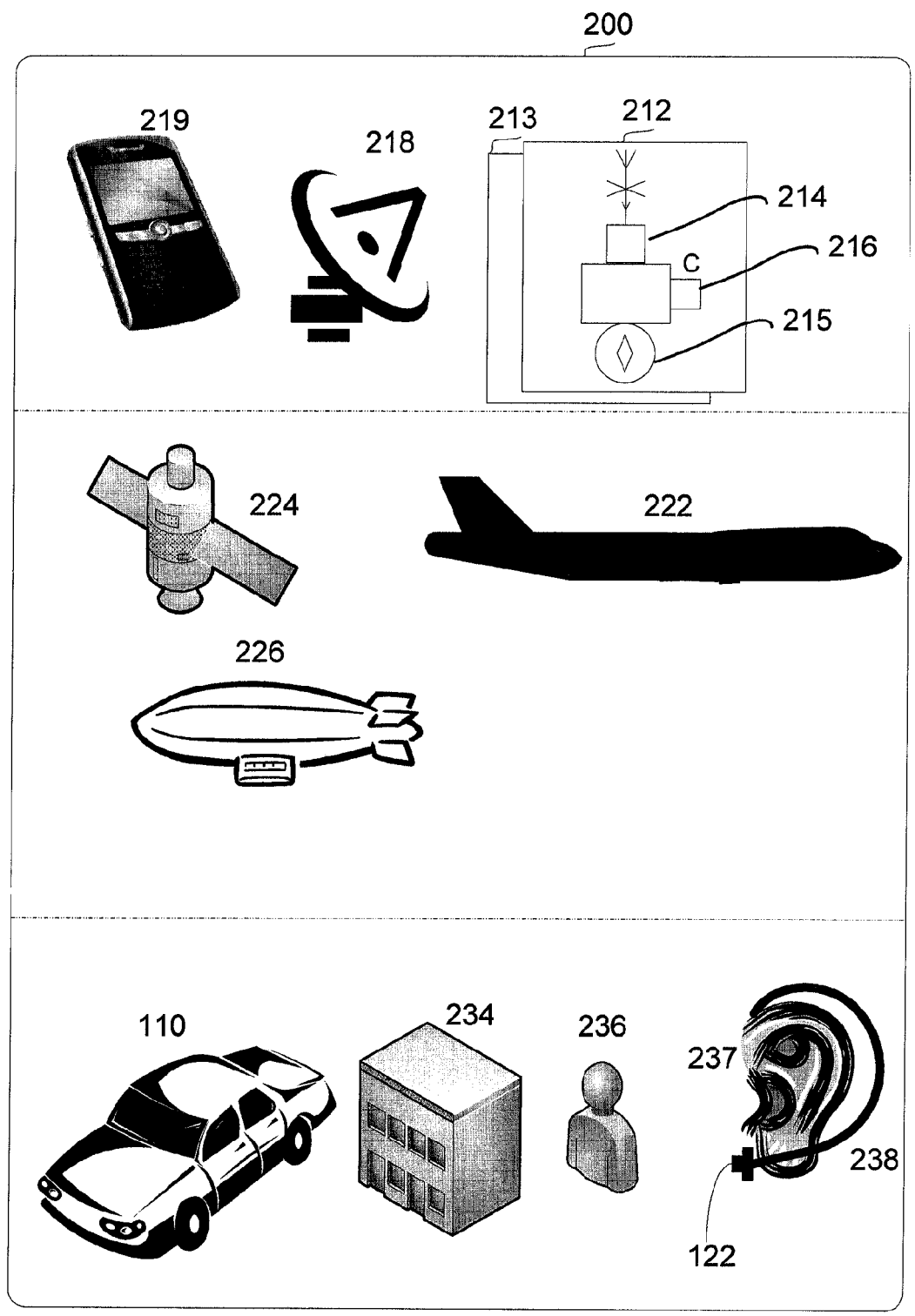
FIG. 2 is a scheme describing the system and process in accordance with an exemplary embodiment of the invention.

FIG. 2 is a scheme describing the system and process in accordance with an exemplary embodiment of the invention. System 200 performs the process of gathering surface data using devices such as: a) a camera system 212 comprising a camera 216 and optionally a GPS 214 and/or INS units 215. It is to be noted that preferably there are similar systems such as 213 capturing data at the same time. In a similar manner there could be further similar system such 218 and/or 219 gathering data at the same time and/or being at the same location and/or gathering data of the same surface object; b) a LIDAR 218 or RADAR system using pulses of waves to capture data; and c) a mobile camera phone 219, preferably one that resides in an ordinary mobile phone or a navigation system, and preferably one that is able to provide further geo-location data such as GPS or other triangulation data.

System 200 can also perform the process of gathering surface data using an Airborne Platform to carry said devices such as an airplane 222; an airship 226; a satellite 224.

System 200 may also perform the process of gathering surface data using a surface level platform comprising, a) a vehicle such as car 110 or a motorcycle in which case 219 can be a navigation system placed on the inner part of a car windows and having a camera and preferably captures visual object while moving. Optionally vehicle 110 carries a camera such as 122 close to it front or back license plate. Alternatively, camera 122 is installed on the front and/or back license plate of the car. The surface level platform may also comprise, b) a building 234; c) a person 236; and/or, d) a human body part such as ear 237 having an earpiece 238 equipped with camera 122.

Figure 3:
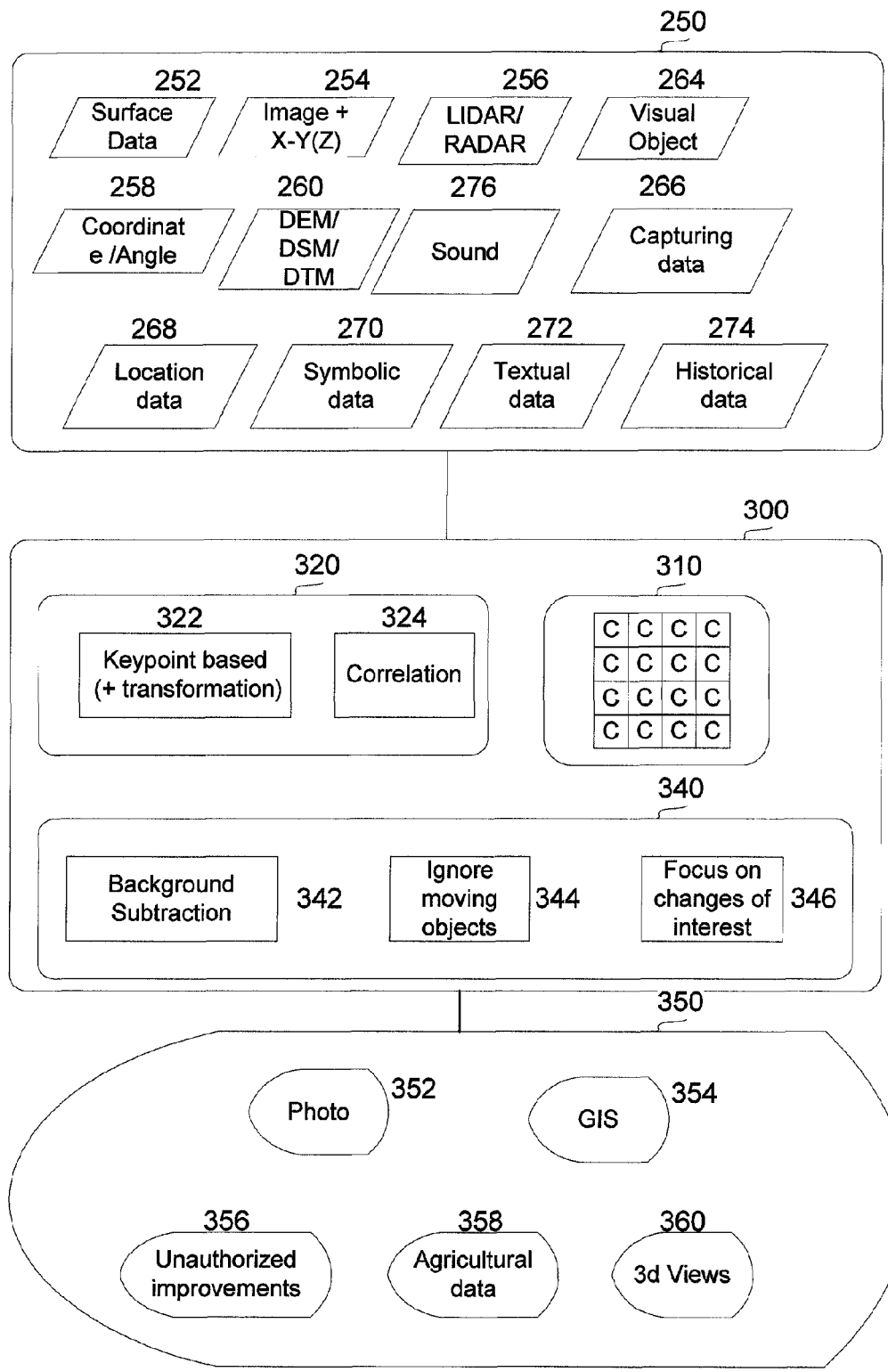
FIG. 3 is a high level block diagram illustrating a data processing and presenting according to some embodiments of the invention.

FIG. 3 is a high level block diagram illustrating data processing and presenting according to some embodiments of the invention. The inputs for system 250 are comprised of: 260 DEM and/or DSM and/or DTM collected using systems such as 200; 252 Surface data; 254 images, and preferably models that include images and X-Y-Z/Polar coordinates for each pixel/object in said image; 256 LIDAR or Radar data; 258 GPS and/or INS data such as 6 dimensional data comprised of latitude, longitude, height, pitch, roll, and yaw; 264 Visual object; 266 Capturing data; 268 Location data; 270 Symbolic data; 272 Textual data; 274 Historical data, such as the last object identified at the same coordinates; and, 276 sound waves. These inputs and historical data of the same location and/or object are processed by subsystem 300. Subsystem 300 is preferably using one or more GPU's 310 as processing of large data sets requires a significant amount of computation and the usage of parallel algorithms such as keypoint descriptors comparison.

System 300 is further comprised of three subsystems: 310, 320, and 340. Subsystem 320 does content analysis, comprising change detection between two or more data sets such as: 322 keypoints and 324 correlation based methods such as 2D correlation.

Keypoint based comparison methods 322, such as SIFT methods comprising Scale-invariant feature transform, or similar methods such as GLOH (Gradient Location and Orientation Histogram), PCA-SIFT and MSR. Such methods usually use a keypoint localization step, and later on compare many keypoint descriptors in one object to a plurality of keypoint descriptors in another object. This requires quick computation in order to compare an object to a plurality of objects within a response time that an ordinary user would expect. The higher the number or the percentage of keypoint descriptors in a first object that match (exactly or approximately) keypoint descriptors in a second object, then the higher is the similarity between the two objects. Preferably the module uses keypoints of transformed object based methods. The transformation can even further use 250 data such as 258 and/or 260 to create estimated needed compensation transform. For example, if there is a 5° deviation between two images of the same building, then it can correct the resulting keypoint accordingly using methods such as Haar wavelet transform and comparing the color histograms of the object to other color histograms. The methods can be used separately, one after another or in parallel. In case a heavily computational method is used it is advisable to use a GPU such as 310 to attain a reasonable response time and to run parallel algorithms.

Subsystem 340 used to filter in the more important changes using modules 342, 344, and 346. Object subtraction module 342 is used to ignore object such as trees, and water and grass. Module 344 is used to ignore mobile objects such as cars or people using their calculated speed, size, or the fact they do not reappear in two consecutive images or two image modalities. And module 346 is used to focus on objects of interest such as houses using their visual characteristics (such as shape, color, texture, known patterns, and edges).

Figure 12:
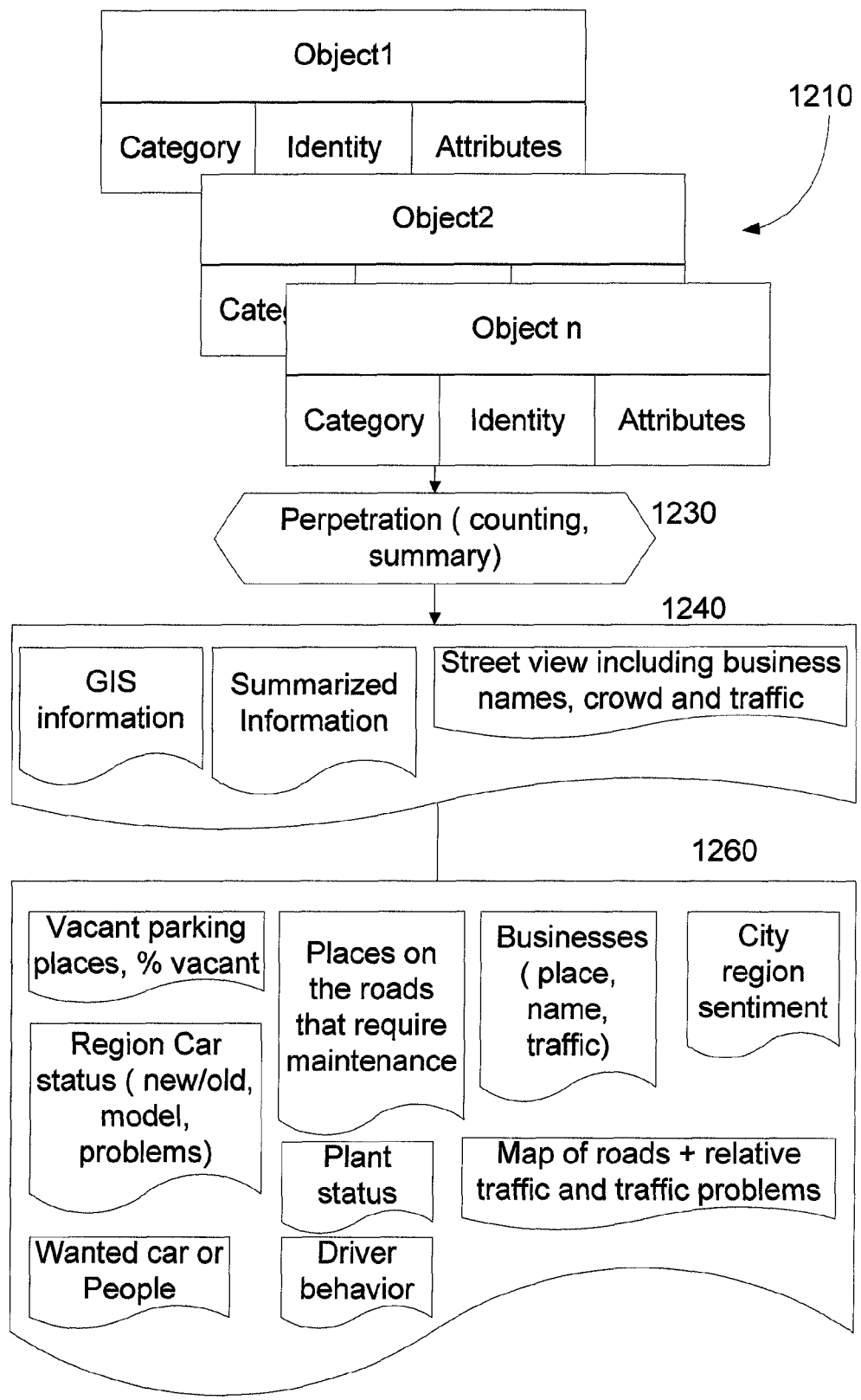
FIG. 12 is a scheme describing a system and process in accordance with an exemplary embodiment of the invention.

Subsystem 350 presents the data in a format useful for the intended applications such as: 352 Photo with marked changes from previous photo(s) and preferably comprising a digital signature in order to be legally accepted as evidence; 354 GIS output; 356 a report of unauthorized improvements done to objects such as adding a room to a house; 358 agricultural data such as growth rate of crops; and, 360 3D views such as urban maps. Reports are as shown in FIGS. 12, 1240 and 1260.

Figure 4A:
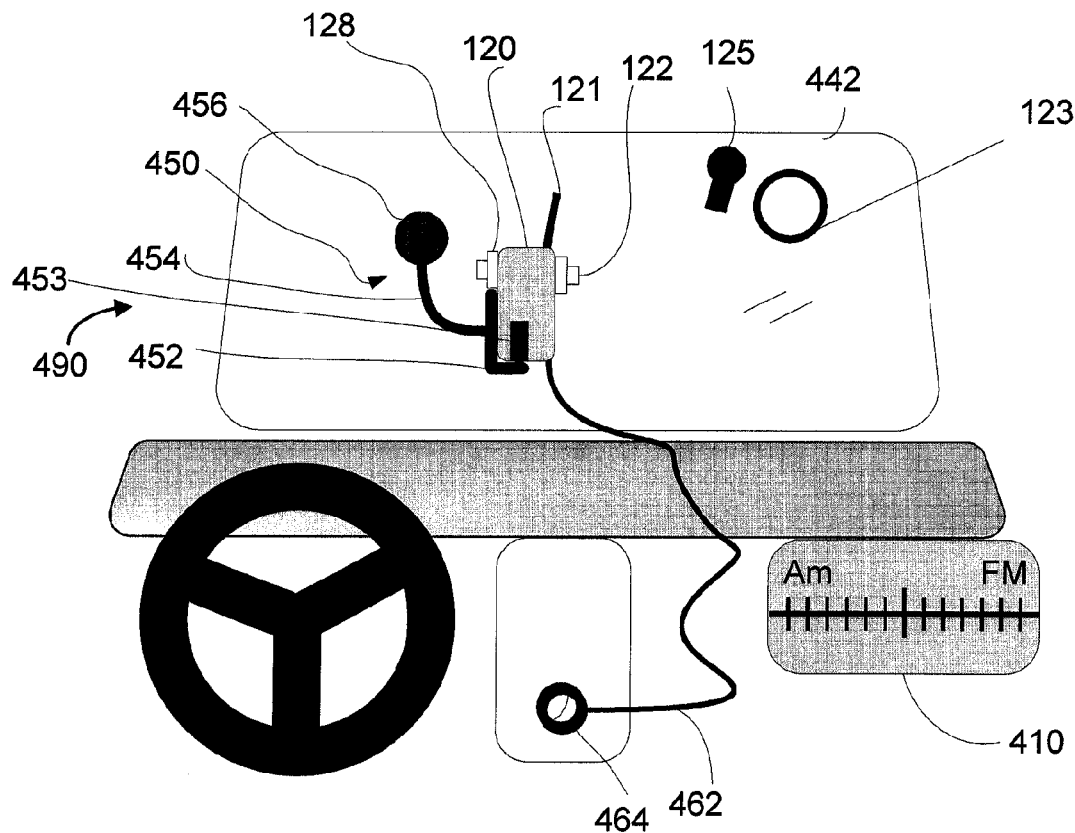
FIG. 4A is a scheme describing a system and process in accordance with an exemplary embodiment of the invention.

FIG. 4A is a front view of a system and process in accordance with an exemplary embodiment of the invention. System 490 is located on the inner part of a vehicle such as 110. It can be mounted on the front window 442 or the back window 444 of the vehicle. The system is comprised of the following. Vehicle mount 450 comprises: suction cup 456; arm 454; and cradle 452. Suction cup 456 is a device usually made of rubber or plastic that sticks to smooth, nonporous surfaces such as 442. This device can be replaced by an adhesive unit. Arm 454 is attached to both 456 and 452. Sometimes arm 454 is flexible. Cradle 452 can grip a device such as 120. Cradle 452 is adapted to enable repeated quick and repeatable mounting and un-mounting (for example in less than 5 seconds), by using side holders 453 that grab device 120 from its left and right side. In some cases one of the corners of cradle 452 is eliminated or cut to clear line of sight for camera 122 and/or 128. Optionally system 490 may use detachable cameras 123 and/or detachable microphones 125 installed within the vehicle in addition to or instead of device's cameras and microphones 122/128. The detachable cameras and microphones may be positioned on the vehicles' front and/or sides and/or back and/or top.

Device 120 is a device having a processing unit, such as a smart-phone, such as an iPhone device. Sometimes device 120 is mobile and sometimes it is stationary. Sometimes device 120 has multiple cores (such as a graphic card) that enable executing parallel algorithms. Sometimes device 120 has an internal and/or external antenna such as 121. Antenna 121 can wirelessly connect the device to a public network such as the Internet and thus transmit the information gathered by the device to a remote server and/or to other users, such as other users of a device such as 120 and thereby share that information.

Device 120 can have one back side camera such as 122 or an additional camera such as 128. Sometimes device 120 runs a second application such as a Navigation application in parallel to performing the process of FIG. 5. Sometimes though, while the camera is actively capturing images, device 120 is adapted not to display the captured image. Sometimes device 120 uses means for receiving power such as cable 462 that connects to the a car lighter socket 464. Device 410 is a media player such as a car radio.

In addition, Camera 128 can be placed in parallel to camera 122 to enable a 3D photography. More cameras such as 128 may capture multi-angle images. These images can be used to estimate the distance to or the size of a captured object such as object 130 further described in FIG. 6.

Figure 4B:
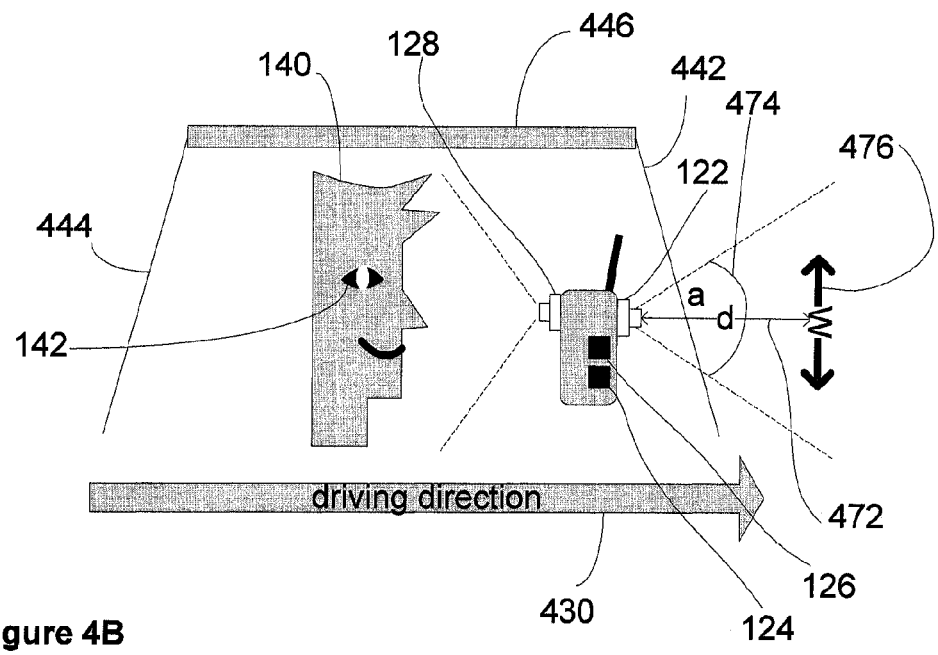
FIG. 4B is a side view of a system and process in accordance with an exemplary embodiment of the invention described in FIG. 4A.

FIG. 4B is a side view of a system and process in accordance with an exemplary embodiment of the invention described in FIG. 4A. The vehicle's driving direction is defined in 430. The vehicle has a front window 442, a back window 444, and a roof 446. The vehicle is driven by driver 140, and the driver's eye is marked 142. Sometimes device 120 has additional sensors 124, and 126, comprising one or more of: Microphone; Accelerometer; Compass; GPS or AGPS receiver; Magnetic sensors; Proximity sensor; Capacitive sensors; Finger print sensor; Chemical sensor; Machine olfaction sensor; $CO_2$ sensor; Bio-sensors; a sensor matrix of any of the above; and, a temperature sensor either one that requires contact with the measured medium or one capable of remote measurement of temperature. For example a microphone can be used to capture sound waves indicating a car problem. In another example motion sensor 124 and/or camera 128 can be used as a car theft alarm, hence in case the car is moved while its owners are out of the car, it will produce an alarm sound and/or call and/or SMS its owner and or the police. And a front camera such as 128 can capture a visual object, and its analysis can indicate driver 140 has fallen asleep as his eye leads have been closed for a period longer than a predefined threshold.

Device 120 can also receive data from a remote server indicating such as triangulation data indicative of its location and/or estimated speed. Another option is to calculate the speed from one or more images taken by camera 122. Camera 122 can be used to estimate the distanced 472 between 120 and another object such as 130 of FIG. 6. Distance "d" can be estimated using the formula: $d = S*Wmax/(2W*\tan(a/2))$, where: 474 is "a" the angular extent of a given scene that is imaged by camera 122; "S" is the known width of object such as object 130 in metric units; 476 is "W" the width of object such as object 130 in pixel units; and "Wmax" is the maximal width of an object in pixel units in camera 122.

Figure 5:
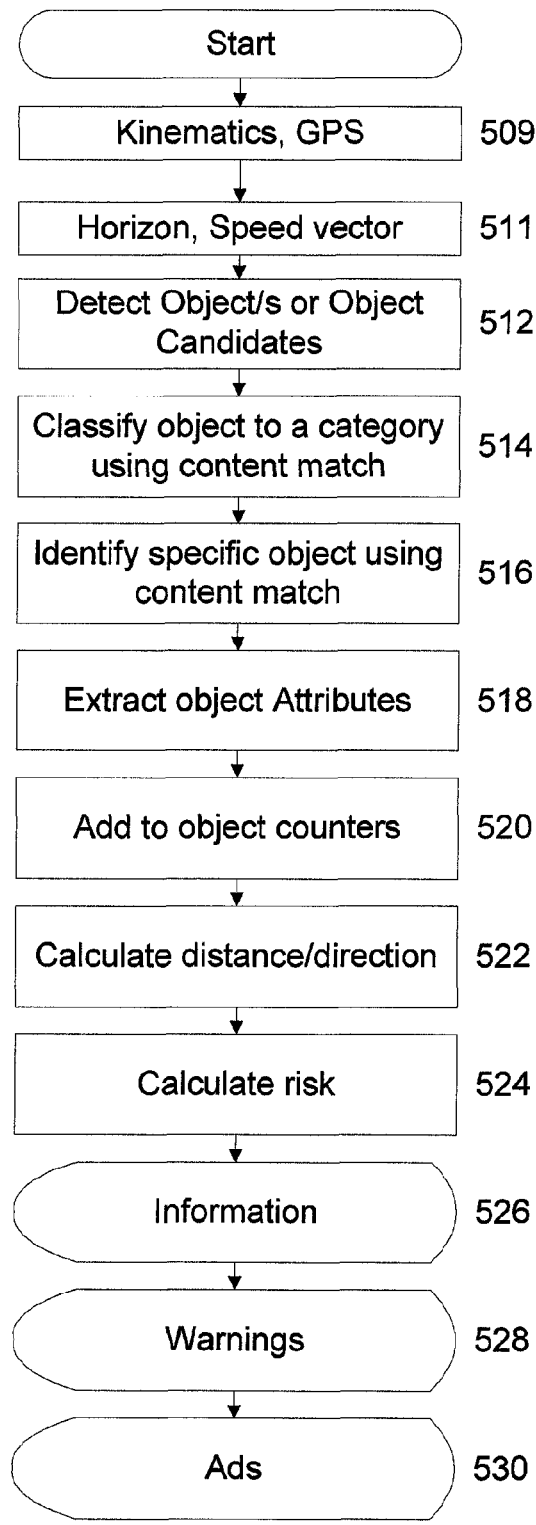
FIG. 5 is a flowchart of acts performed in accordance with an exemplary embodiment of the invention.

FIG. 5 is a flowchart of acts performed in accordance with an exemplary embodiment of the invention. The acts serve the content matching needed in the embodiments described in figures such as FIGS. 4, 6, 7, 8, 9, 10, 11, and 21. One of the inputs for the process is a visual object such as a photo frame captured by camera 122. Others are for example sensors 124,126 input and other data as shown in 250. Processing can be performed on device 120 or on remote servers.

As illustrated in FIG. 5, the following acts are performed, not necessarily in the following order. Step 509—receive location data such as GPS, AGPS, Cellular triangulation data and/or sensor 124,126 data such as acceleration, and camera 122,128 data and time. Step 511—use the above data to compute the speed in which 110 is traveling (both magnitude and direction in 3 axes). For example, two GPS points and in two time points give the average velocity. Speed can also be calculated using the camera data. Angular data from sensors data can give the estimated horizon point. The horizon can be calculated using the camera data as well. Other possible computations are: Tilt—both to the side (around Z axis) and to the front (around Y axis), calculated from the orientation sensor values; Horizon Line—calculated from the tilt of the device around its Y axis and translated to pixel Y-coordinate according to the screen resolution; Bearing line—though it can be calibrated manually by the user dragging the vertical bearing line. A few automatic methods for calculating the bearing line are possible: calculating the angle between the compass azimuth and the GPS- based bearing azimuth; calculating the angle between the phone screen and the car's windshield based on the average forces working on the phone (from the accelerometer sensor); and, calculating the driving direction using pattern recognition of the street lane lines.

As further illustrated in FIG. 5, the following acts are performed. Step 512—an object is detected, for example a car such as 130. Step 514—the object is classified to a category, for example a car, a motorcycle or a person. Step 516—a specific object is identified, such as the car from a previous frame, or a person called John Smith. Step 518—specific object attributes are extracted such as: Vehicle color; Vehicle model; Vehicle model year; Vehicle manufacturer; Texture; Shape; License plate numbers; Hair color; and, Object dimension such car's width, person's height. Step 520—object can be counted such as counting the number of cars on the road, or the number of shoppers 834 near store 832. Step 522—distance and/or direction are calculated to the object such as: the distance from 122 as shown in FIG. 4B; the direction to the object such as the angular direction; the relative speed from the object; and, the time to collision with the object. Step 524—the risk of collision is calculated taking in to account: device 120's speed using parameters such as GPS and devices sensors such as 124; estimated time to collision; road conditions; vehicle condition; visibility; driver's conditions such as estimated reaction time; and, sensor information from 124, 126.

In case no object or object candidate, such as a car 130, was detected, the system will stop its operation for a predefined limited time in order to reduce CPU consumption and/or battery consumption and/or prevent device from heating. When the predefined pausing period is over system will be automatically reactivated and object detection process as mentioned in step 512 will re-occur.

Device 120, or devices connected to it, can then show to the user such as driver 140 and/or other users in vehicle 110, information comprising: 526 object information such as any of the attributes described in step 518; 528 warning, such as driver warning or advice (i.e. a suggestion to change a lane using GIS information such as 1240 and traffic flow information); 530 advertisements such as sales in store 834. Sometimes ads are local ads of businesses close to 120. The advertisements are optionally directed at inducing, promoting and/or encouraging purchase of products and/or services and/or acceptance of ideas. Optionally, the user to which the advertisements are displayed is not charged for display of the advertisements, but rather the provider of the advertisements is charged for their display. In some cases the advertisement is an audio sound such as a radio advertisement. Sometimes the advertisements are displayed only when device 120 indicates the car 110 is slow, in complete stop or in a traffic jam. Steps 512, 514, 516, and 518 can all use Content analysis and Content match. Some of the steps 512-530 are optional.

Figure 6:
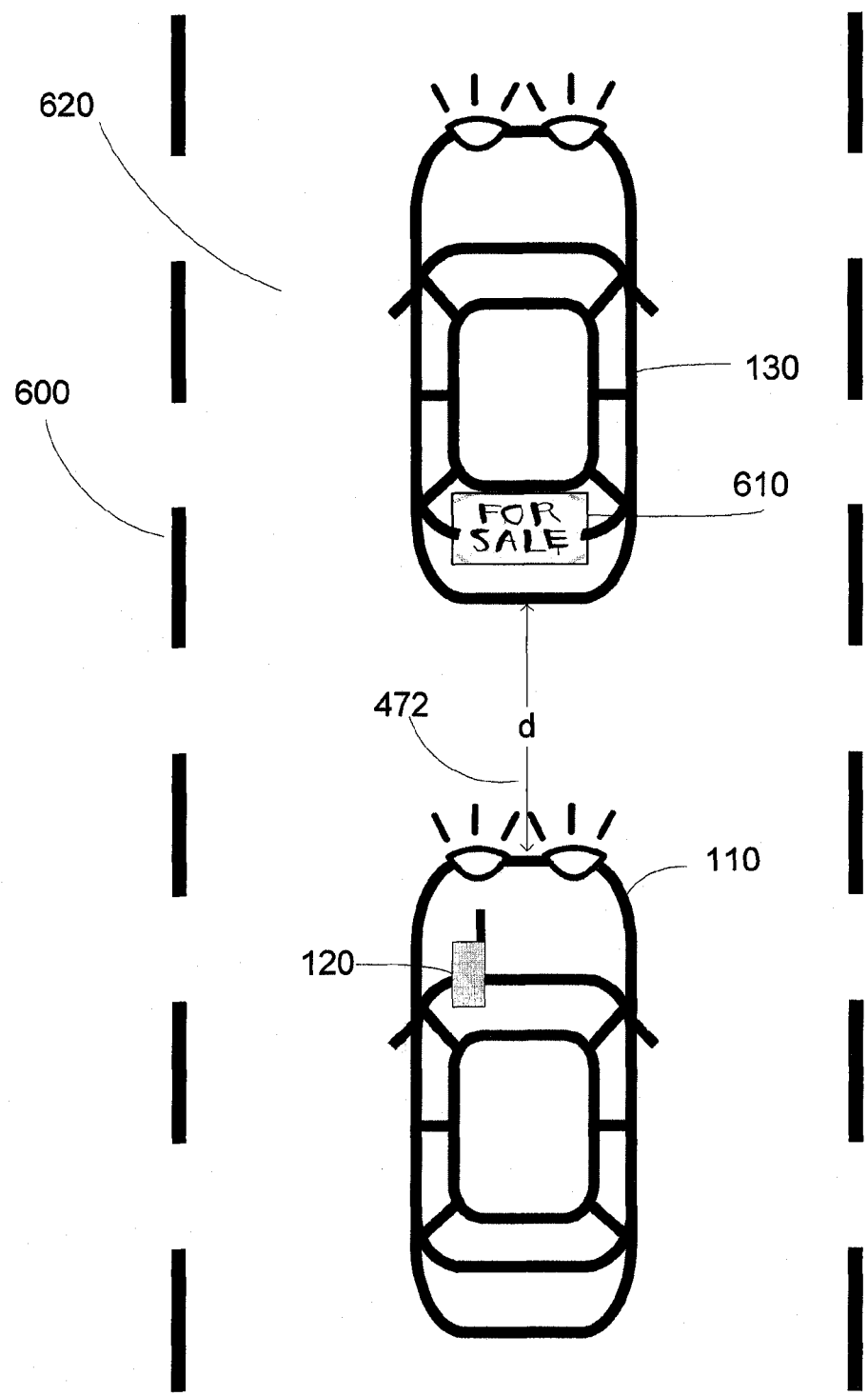
FIG. 6 is a scheme describing a system and process in accordance with an exemplary embodiment of the invention.

FIG. 6 is a scheme describing a system and process in accordance with an exemplary embodiment of the invention. The scheme shows a first lead vehicle 130 traveling along a road 620 and followed by a second vehicle 110 having device 120. Driver 140 is driving the second vehicle 110. System 490 processes images of the environment in front of the second vehicle 110 and produces information out of them. Using this information system 490 calculates distance (d) 472 between the two vehicles 110,130 and the speed of second vehicle 110 at any given time as further described in FIG. 5.

According to these parameters system 490 then processes images taken by camera 122 and estimates the risk of collision between the two vehicles for example by comparing the estimated time to collision and the time to collision threshold. The risk to collision can take in account the breaking time, the cars relative distance, velocity, acceleration and jolt, road conditions (e.g. wet road 826), oil spills, and the presence of another car, and driver's 140 expected reaction time due to his fatigue and his reaction time history. If such an estimated risk crosses a predefined threshold and/or vehicle 110's speed exceeds a permissible level, then the system reaction will occur.

Optionally, system 490 can extract further attributes of vehicle 130 (e.g. a for sale sign 610, vehicle 130's car model, color, size, condition, etc.). If such a vehicle is identified, system 490 produces a relevant notice such as an alert for potential vehicles for sale within a range. These alerts are also accessible to all system's 490 users via the web.

Optionally, system 490 creates a system reaction in case the distance between 110 and 130 and/or the estimated time to collision is below a certain threshold. Optionally, system 490 presents on display 1602, as further described in FIG. 16, time to collision of vehicle 110 with vehicle 130; distance 472 in meters; and vehicle's 130 speed.

Alternatively, 130 is behind car 110 and system 490 creates a system reaction in case the distance between 110 and 130 and/or the estimated time to collision is below a certain threshold. The system reaction can be displayed on the back side such as through the back window 444 of 110 using a back window sign.

Optionally, system 490 has a manual record button or automatically records a series of images or a video of 130 in case 130 performs a certain action such as risky driving or an actual vehicle accident, which can also be indicated by sensors 122,124,126.

Figure 7:
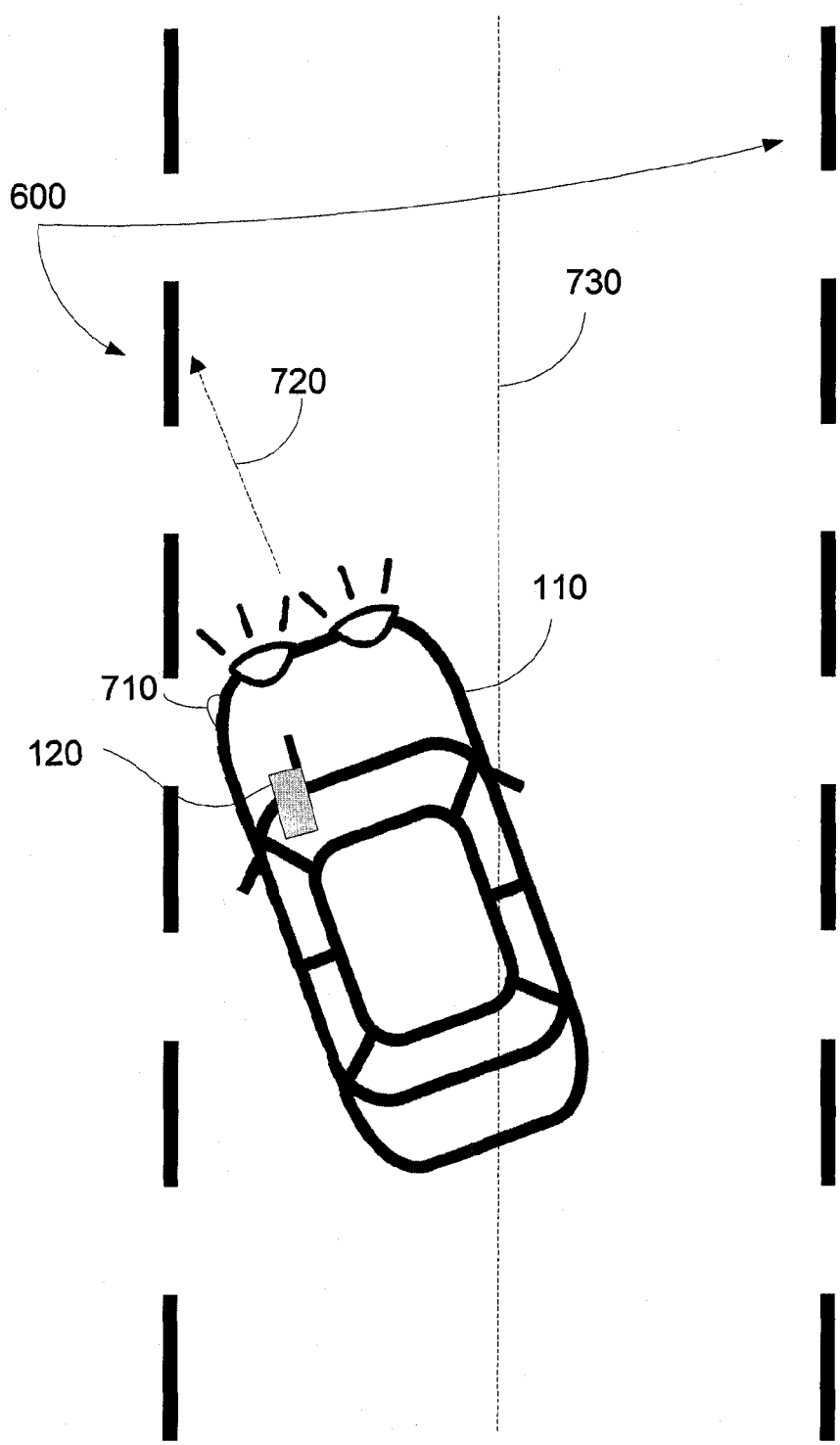
FIG. 7 is a scheme describing a system and process in accordance with an exemplary embodiment of the invention.

FIG. 7 is a scheme describing a system and process in accordance with an exemplary embodiment of the invention. Person 140 drives his vehicle 110 having device 120. He is supposed to drive in accordance with lane markings 600. Nevertheless, during driving, person 140 is falling asleep or not paying attention. Consequently, vehicle driving direction 720 deviates beyond a certain threshold from the middle of the lane markings 730 and even crosses the marking. System 490 process images taken by camera 122 and recognizes using steps such as the ones described in FIG. 5, the deviation from the middle of the lane. If such a deviation crosses a predefined threshold, then system 490 reactions will occur. Optionally, system 490 will use the input from camera 122 and/or microphone 124 to check whether the driver has used the turn blinker 710 in which case no alert will be created.

Optionally, system 490 will use the input from camera 128 and/or microphone 124 to check whether the driver is paying attention to the road while deviating from a lane. In case he is not, alert will be created.

Another possible scenario is person 140 is paying attention to the road, however he is driving too close to one of lane markings 600 instead of driving in the center of the lane 730. System 490 process images taken by camera 122 and recognizes the in-lane relative location using steps such as the ones described in FIG. 5. If vehicle is located too close to a lane marking by predefined threshold, and the driver keeps driving in this location for a predefined time period, system 490 reaction will occur and an alert will be created.

Figure 8:
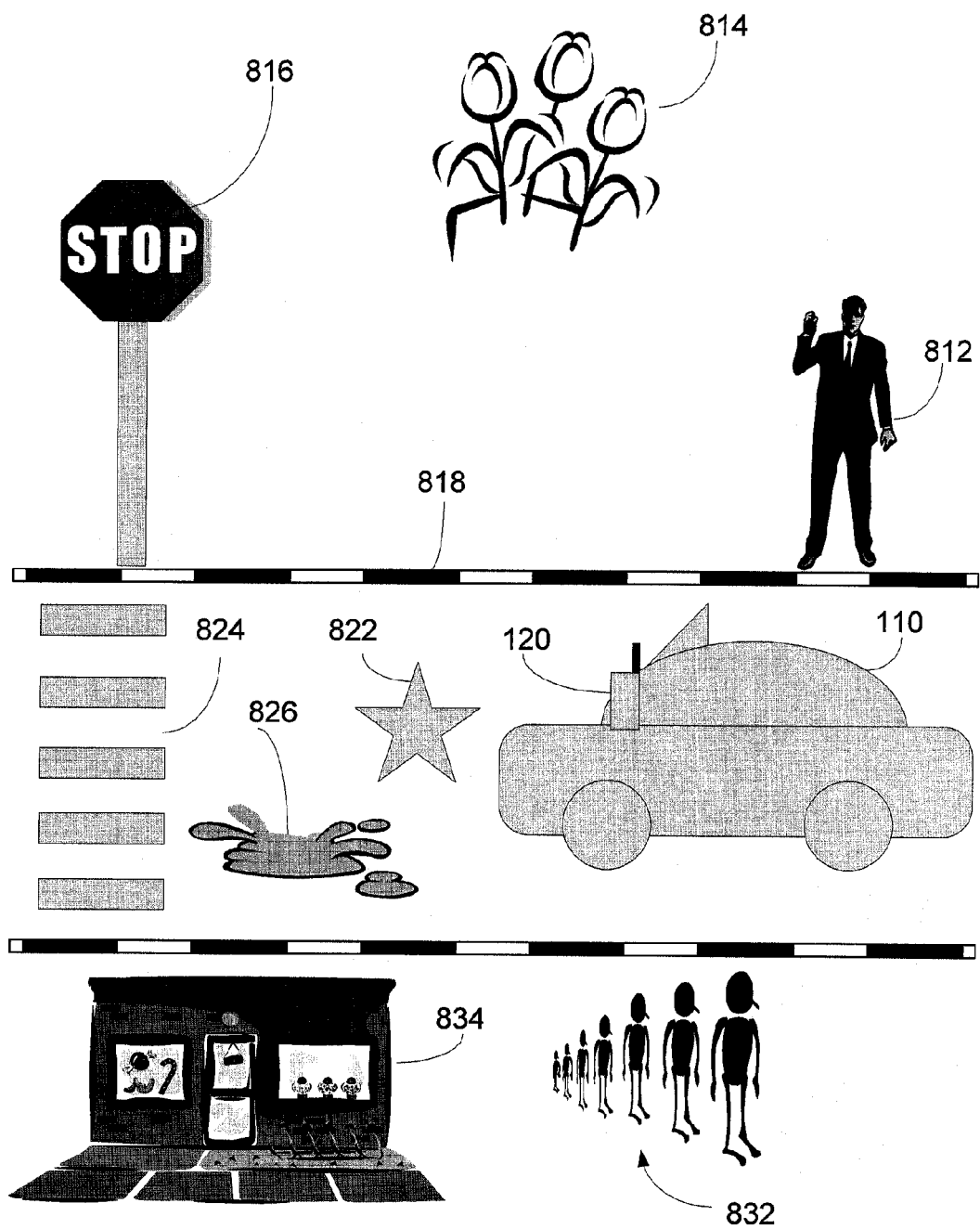
FIG. 8 is a scheme describing a system and process in accordance with an exemplary embodiment of the invention.

FIG. 8 is a scheme describing a system and process in accordance with an exemplary embodiment of the invention. The scheme shows a vehicle/taxi 110 traveling along a road 620. System 490 processes images taken by camera 122,128 of the environment in front of the taxi 110 having device 120, and produces information and data regarding items within driving range, such as: people waiting for a taxi 812, optionally in a real time map; pavement stone 818; shops and businesses 834 and their relevant location; road conditions such as bump 822 or wet road 826; traffic signs above the road level such as stop sign 816, or on the road level such as zebra crossing 824; landscape conditions such as blossoming field 814; crowd 832, and their emotions using features such as smile recognition or by analyzing the sound of the crowd; police vehicles, police men, traps, laser guns; parking meter; traffic lights color; traffic jams; low visibility; traffic offenders and license plate recognition; measure street cleanness level, and a report is sent to municipalities; and, water leaks, and a report is sent.

System 490 uses OCR technology to read and interpret traffic signs above the road level that are relevant to driving abroad. For example, driver 140 is driving in a foreign country. Traffic and information signs are written in a foreign language which he doesn't understand. System 490 will recognize signs above road level, translate and alert driver 140 regarding relevant information.

Another example is a taxi driving along a road. System 490 recognizes people at the side of the road raising their hand for a taxi, wherein system 490 then produces relevant notice available to all system's users via the web.

Yet, another example is while a car is driving along a road, a person's face is captured and compared against a person database (DB), for example: celebrity Faces DB in which case a system reaction is created such as sending a message that the celebrity was seen on a certain location using twitter.com of Facebook.com; abducted children DB in which case a message will be sent to local police; and, a person category DB of police or soldier uniforms.

Figure 9:
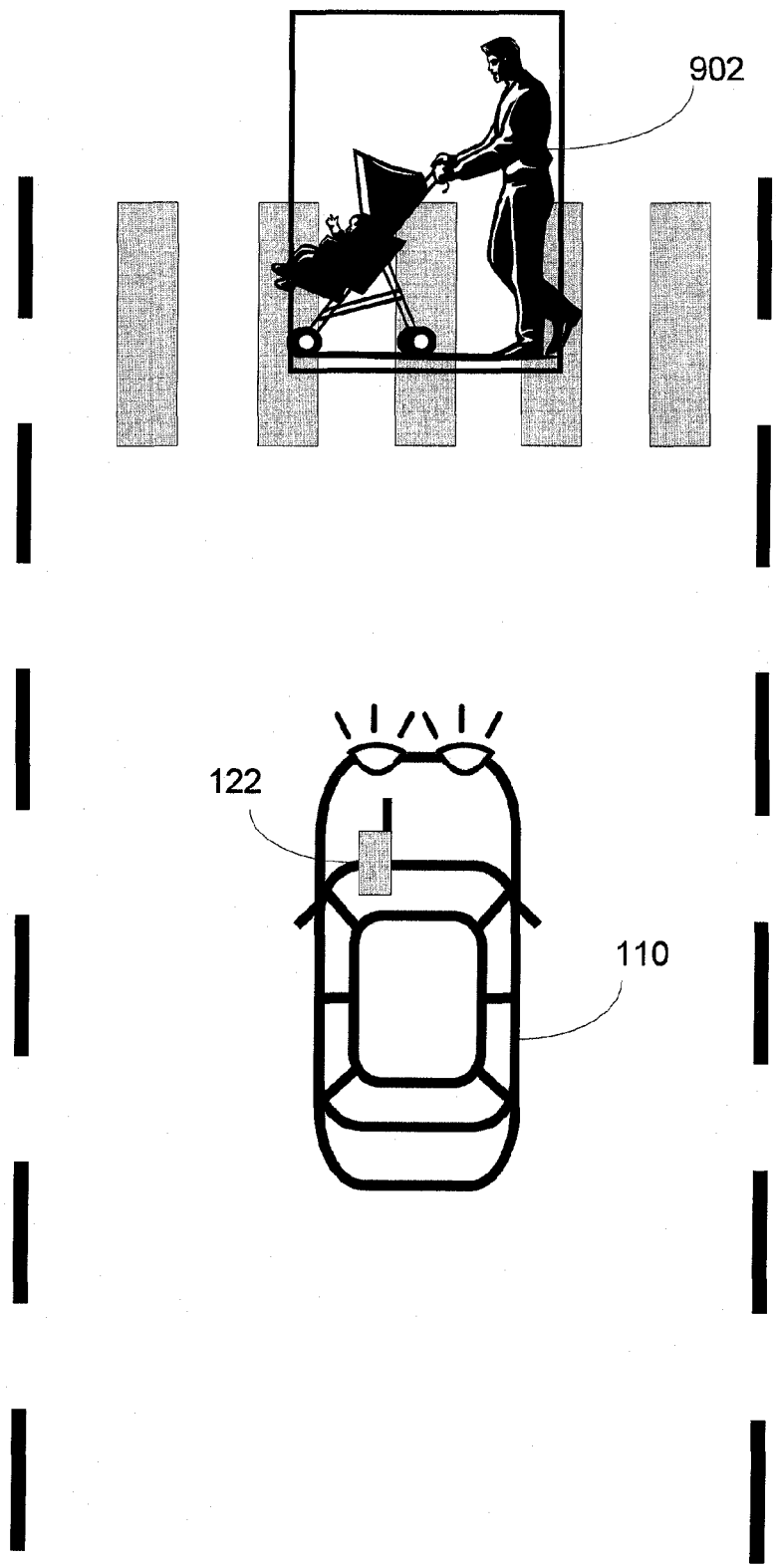
FIG. 9 is a scheme describing a system and process in accordance with an exemplary embodiment of the invention.

FIG. 9 is a scheme describing a system and process in accordance with an exemplary embodiment of the invention. Person 140 drives his vehicle 110. He is driving towards a pedestrian 902 who is crossing the road. Person 140 is falling asleep or not paying attention to the road. As a result he doesn't notice pedestrian 902 crossing the road. System 490 processes images taken by camera 122 and estimates the distance from and/or the relative speed to pedestrian 902 and the estimated risk for an accident. If such a risk crosses a predefined threshold, then the system reaction will occur.

Figure 10:
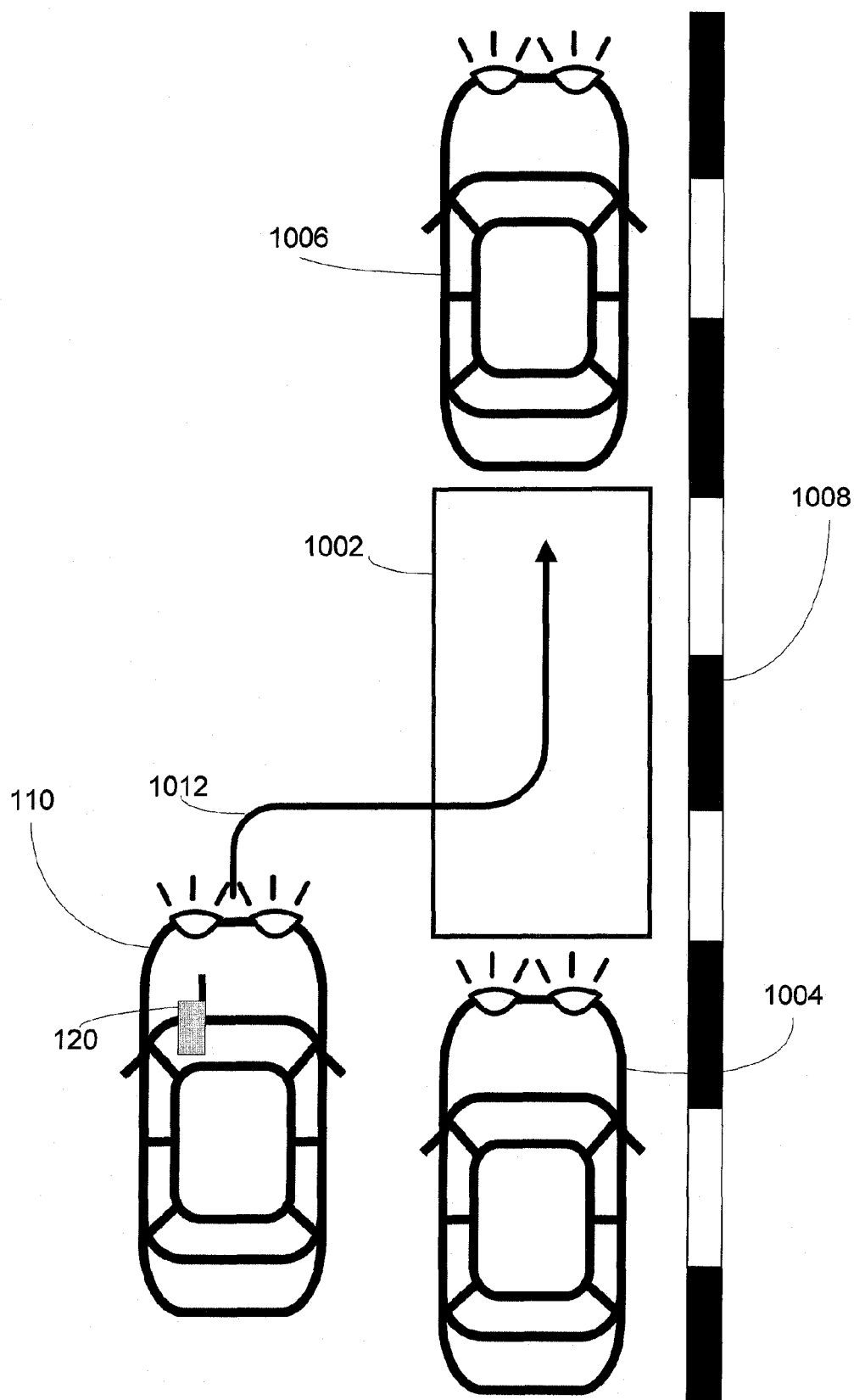
FIG. 10 is a scheme describing a system and process in accordance with an exemplary embodiment of the invention.

FIG. 10 is a scheme describing a system and process in accordance with an exemplary embodiment of the invention. The scheme shows a vehicle 110 having device 120 and traveling along a road 620. Driver 140 is driving his vehicle 110 and is seeking for a parking spot. System 490 processes images of the environment surrounding vehicle 110, and produces information out of them. From this information system 490 identifies available parking spots and alerts driver 140 when one is detected 1002. For example pavement stones marking an allowed parking place such as 1008 that are not taken by cars such as 1006 and 1004 and with a length that is above a predefined length. These alerts are also accessible to all system's 490 users within a suitable range via web. Driver 140 then reaches parking spot 1002, between two parking vehicles 1004, 1006 and tries to park his vehicle 110. System 490 processes images taken by cameras 122,128 and accordingly calculates parking route 1012, then system 490 reaction will occur in order to guide driver 140 into parking spot 1002.

Optionally automatic parking service is activated when a public parking space is detected by querying a geographic based database or by image recognition process as described in FIG. 8. For example, blue and white pavement stones and parking traffic signs.

Optionally system may offer coupons when parking state is detected. Coupons may include but are not limited to business places which are geographic related to parking location. Coupons may also be offered in driving summary report as mentioned in FIG. 12 and when user manually closes the system.

Figure 11:
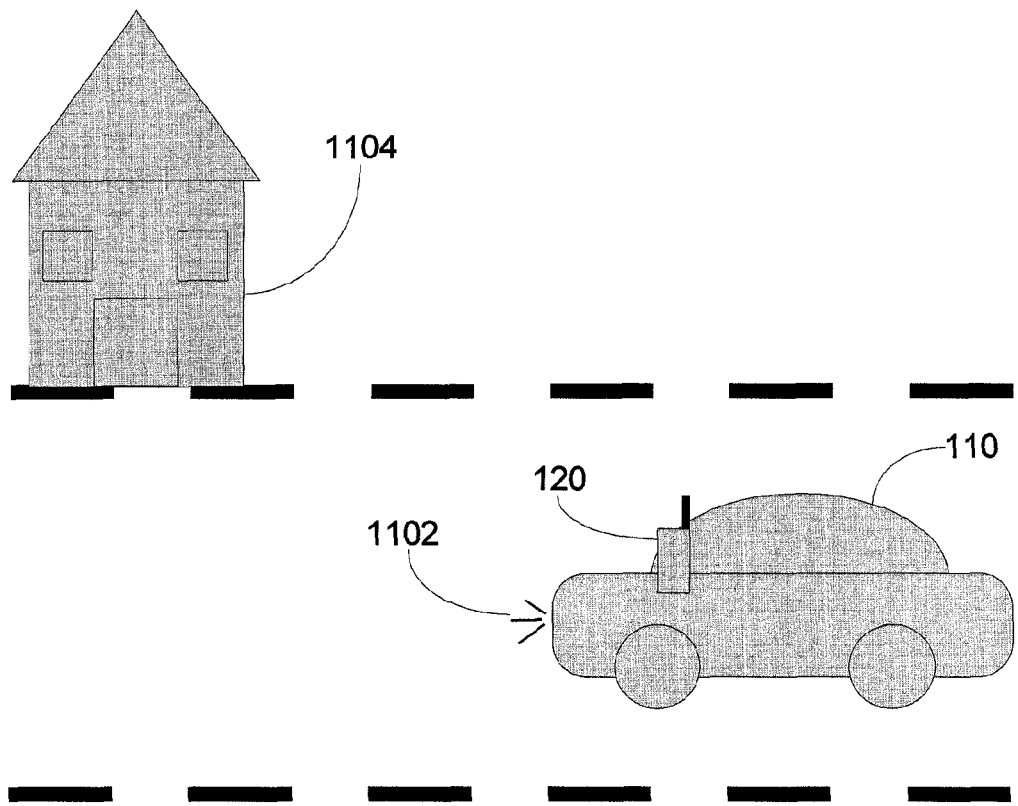
FIG. 11 is a scheme describing a system and process in accordance with an exemplary embodiment of the invention.

FIG. 11 is a scheme describing a system and process in accordance with an exemplary embodiment of the invention. The scheme shows a vehicle 110 traveling along a road 620. System 490 processes images of the environment in front of the vehicle 110 and recognizes whether it's a day or a night driving. In case of night driving system 490 checks whether vehicle lights 1102 are turned on. If lights 1102 are off, then system 490 preforms a reaction. Moreover, system 490 recognizes whether vehicle 110 has reached its destination 1104 using Micronavigation, for example, by comparing the input received by 120 to the known images taken before on the coordinates. In case of the destination arrival, the system produces relevant notice. Micronavigation can be also used to navigate person 236 to a specific shelf in store 834. Or to assist a driver in navigation such as telling him to change lanes or take a turn.

FIG. 12 is a scheme describing a system and process in accordance with an exemplary embodiment of the invention. Information is collected using the act described in FIG. 5 using one or more systems such as 490 on one or more objects 1210. Optionally for each object its category 514 and attributes 518 are extracted. Object of the same or similar coordinates and or attributes can be counted 1230 in order to analyze the data. Preparation 1230 is sometimes the preparation such as 1240. The reports of 1240 can be of several categories such as: GIS information reports, summarized information and street view including business names, crowd and traffic.

Figure 13:
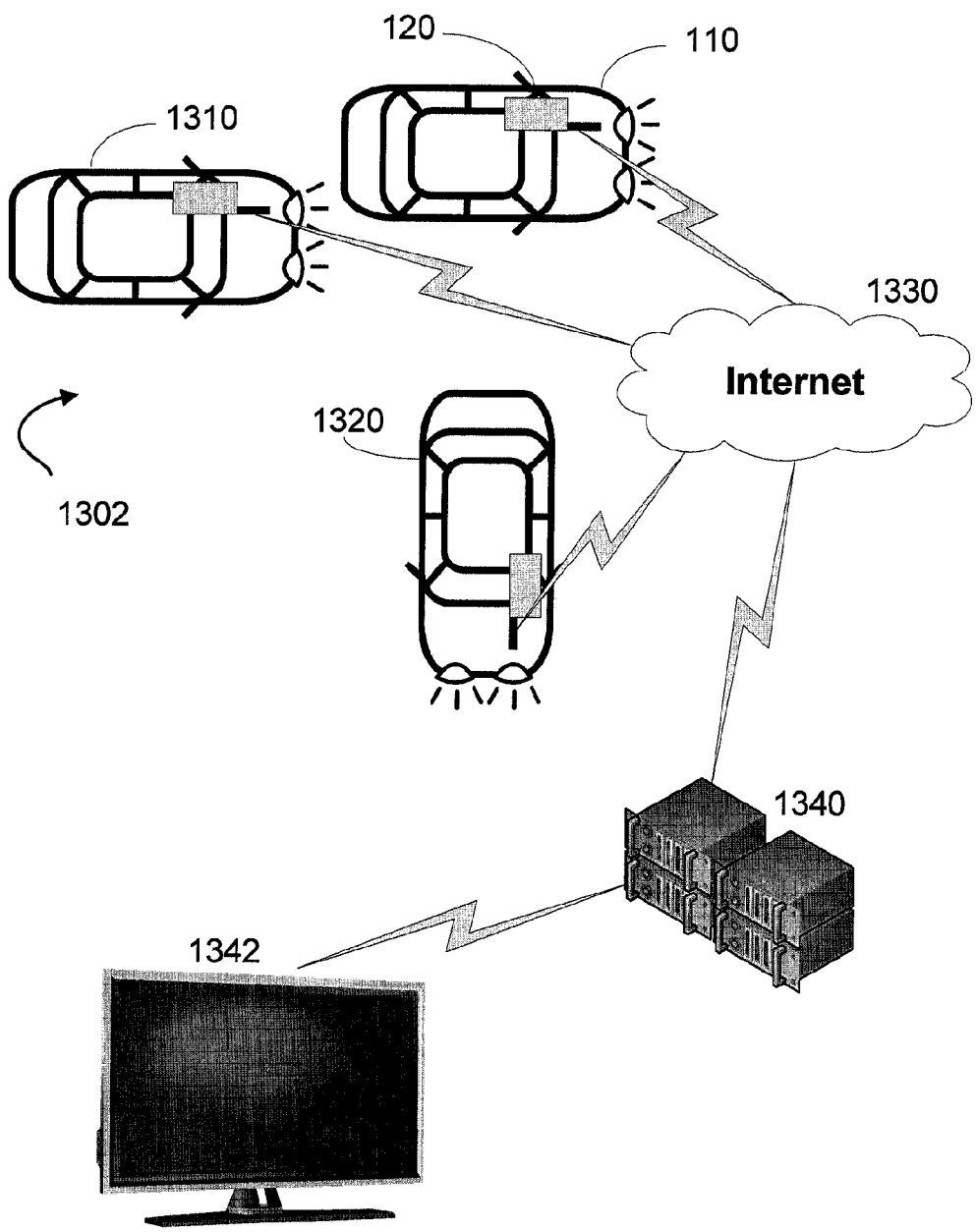
FIG. 13 is a scheme describing a system and process in accordance with an exemplary embodiment of the invention.

Examples of such reports are shown in 1260. A report of vacant parking places is created when, for example, multiple cars such as 110 are driving through the city, as shown in FIG. 13, in case a car comes across a vacant parking place, then that spot is reported back through a public network to create the report; A report of places in the road that require fixing such as 822 is created, that can help the municipal authority fix them; A report is created on businesses on the street, their names and block numbers (using OCR), the amount of traffic that passes next to them such as 832, the number of people inside or waiting outside of them. The report may also comprise the emotions of these people (using smile recognition and/or analyzing the sounds that crowd is making); A report is created on the overall sentiment in a certain city region; A report is created on the overall status of vehicles in a certain region such as their models, are they old or new, do they have mechanical problems, what is the level of pollution they are making; A report is created on the status of plants in the city comprising for example, how many green regions there are, how many of them need irrigation (using IR), and how many of them are blossoming.

In FIG. 12, 1260 a map of the city is also created comprising: roads using road recognition (for example many asphalt roads are black); buildings using building recognition; street name and/or number of each of them using OCR of the street signs; and, traffic signs such as 816, 824, 600 using content match to traffic sign DB, including changing signs such as LED signs.

In FIG. 12, 1260 a real time map of the temperature on different parts of a region, such as a city temperature map is created.

In FIG. 12, 1260 a report is created on driver behavior, the data collected by device 120 using camera 122 and/or sensors 124, 126 such as: acceleration, breaking, speed, accidents, near accidents, collision warnings, turn taking, economic driving, fuel consumption, in-lane location, lane departure warnings, distribution of distance and distribution of headway distance time, can all be collected to create a database of driver behavior considering conditions of road, weather, light and vehicle. The specific driver can be identified using face recognition or by the identity of device 120. The data can be used to evaluate the risk of the specific driver making an accident and an overall risk scoring can be computed for that driver. The result can be the estimated cost of the driver is insurance risk and/or gas consumption to be used by the driver and/or his company and/or insurer, and/or country tax authority, and/or other institutes.

For example, Drivers with estimated low insurance risk can be displayed with offers to buy insurance from a specific provider.

Driving behavior scoring can be computed in a positive manner by awarding safety points for mentioned predefined good driving parameters, which may grant the driver benefits that may include but are not limited to insurance policy deduction, tax reduction, gas prices discount, traffic fines cancellation or reduction, traffic violation cancellation, etc.

Driving behavior scoring can be computed in a normalized manner which will produce a score that will indicate the driver's safety driving analysis.

In FIG. 12, a report 1260 is created on wanted vehicles, for example each car such as 110, 1310, and 1320 carry system such as 490 using devices such as 120. In case system 490 identifies a license plate of a neighboring car such as 130, it uses LPR to report the license plate to a remote server such as 1340. The remote server compares the found license plate to a wanted car database such as stolen cars, fugitives, and people with unpaid debt. In case a match is found a system reaction is created such as an SMS to the local police station.

In FIG. 12, a report 1260 is created of places of interest, for example places where vehicles or people tend to slow down or even stop (that could be measured using GPS, acceleration, or the camera) are considered places that create a higher level of interest.

FIG. 13 is a scheme describing a system and process in accordance with an exemplary embodiment of the invention. The System is comprised of: a fleet of platform such as 200, for example cars 110, 1310, 1320 where each of them carries devices such as 120. Platforms are connected via a public network such as wireless Internet 1330 to a remote server 1340. Servers processes the captured by 1302 such as shown in FIG. 5 or step 1230. Reports such as 1240, 1260 are shown using devices such as 120 or on a remote terminal such as 1342.

Figure 14A:
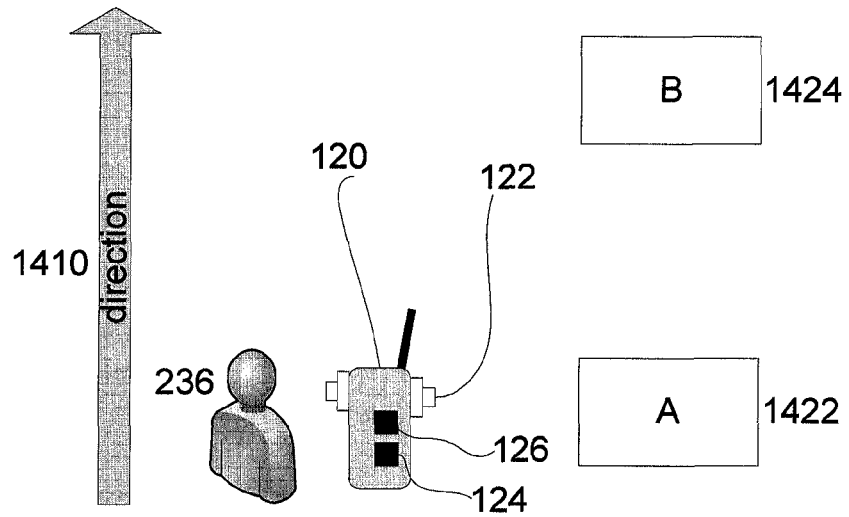
FIG. 14A and 14B are a scheme describing a system and process in accordance with an exemplary embodiment of the invention; and, FIG. 15 is a schematic illustration of an information display system.
Figure 14B:
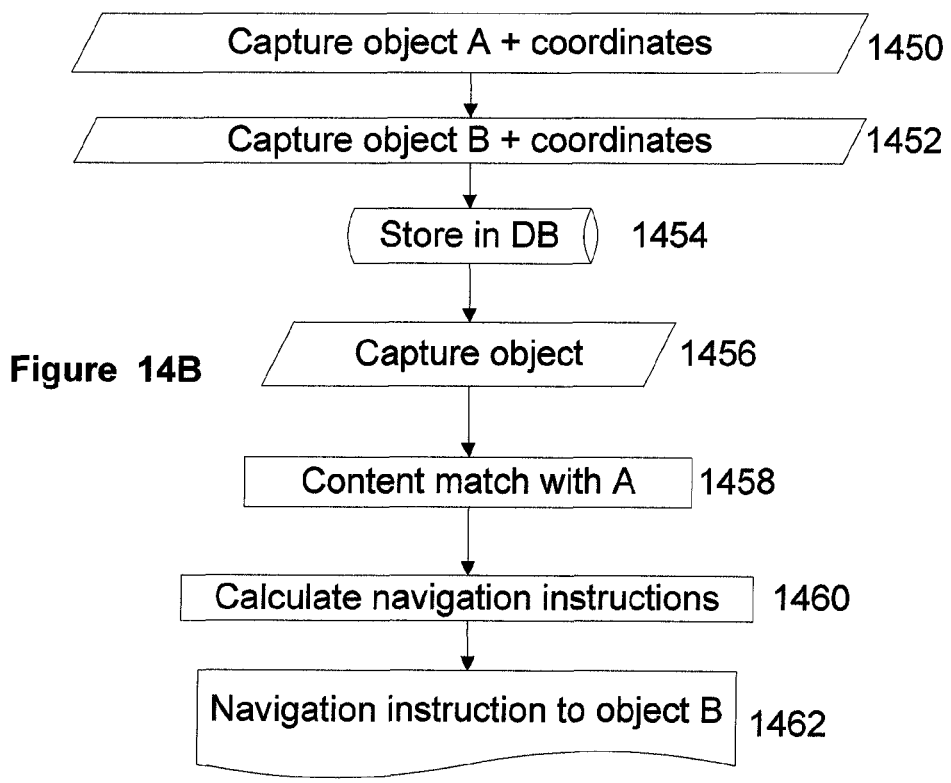

FIGS. 14A and 14B are schemes describing a system and process in accordance with an exemplary embodiment of the invention. Object A and its coordinates are captured 1450 and its coordinates are recorded using systems such as a GPS. The same steps are performed on Object B 1452, and data on both objects is stored 1454 in a DB. Person 236 is moving in direction 1410 and passes by Object A marked 1422 requests system such as 120 to get to Object B marked 1424 or its coordinates. Device 120 uses sensors such as 122, 128, 124, 126 to capture information on object 1422 as described in step 1456. The Captured data on object 1422 is compared against the data in the DB of 1454 to search 1458 for a content match. In case content match is found with Object A and using it coordinates, then navigation instructions are calculated 1460 using the coordinates of Object B in relation to the coordinates of Object A and displayed 1462 to person 236.

The system and process can also be used for example to navigate in place where GPS usage is not possible such as between stores in a shopping malls, between shelves in a supermarket, to find one's car in a parking lot, and for finding the right door in a an office building. And the system can be used for Micronavigation, for example to identify in case someone is navigating in the wrong lane, or took the wrong turn.

Figure 15:
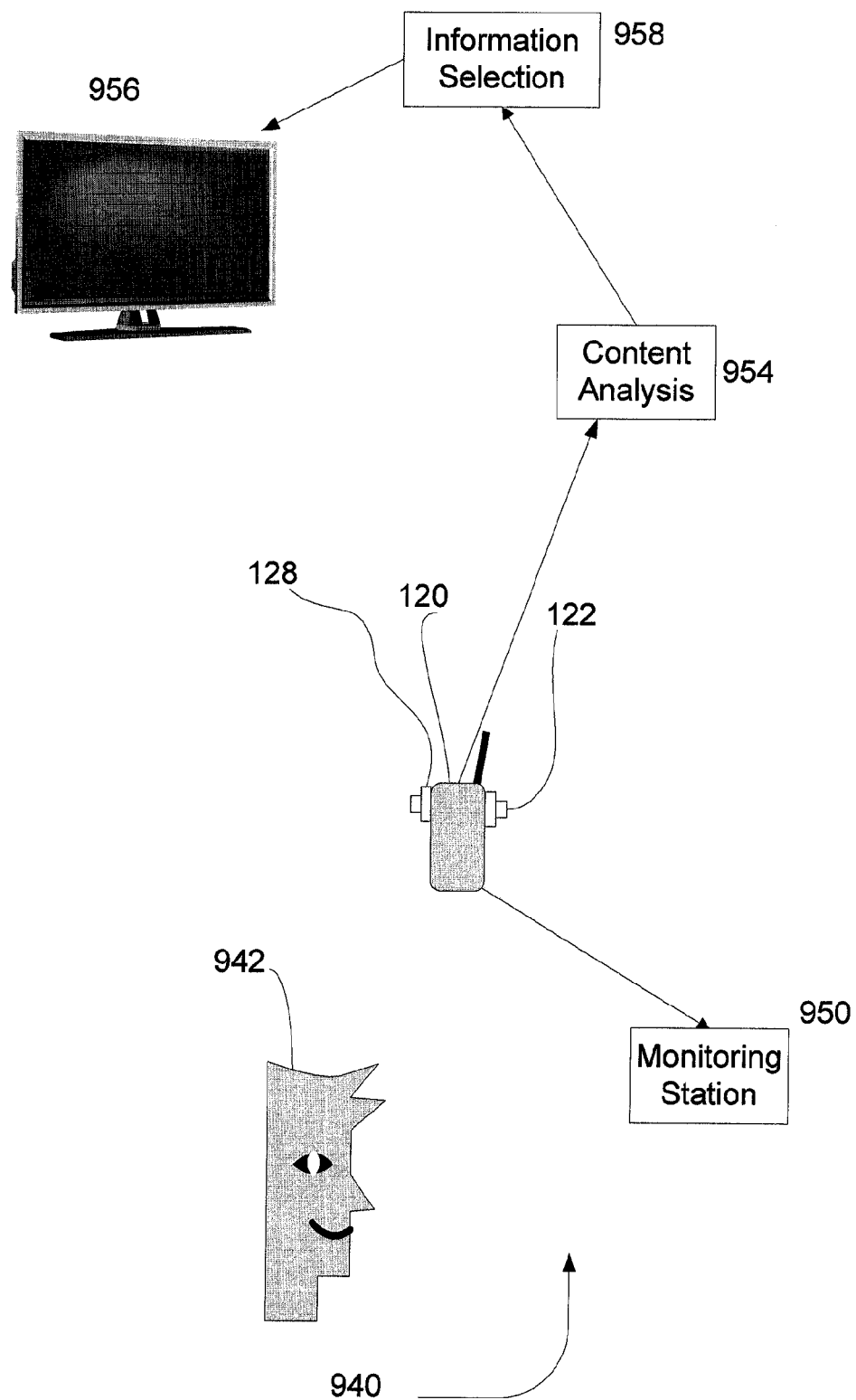

FIG. 15 is a schematic illustration of an information display system 940, in accordance with an exemplary embodiment of the invention. System 940 comprises a device 120 with cameras 122, 128 which acquires images, optionally a video stream of images. The images are provided to a content analysis unit 954 which identifies objects of interest in the images. Information on the identified objects and optionally their attributes is forwarded to an information selection unit 958 which determines accordingly what information is to be displayed on a display 956, using any of the above described methods.

In an exemplary embodiment of the invention device 120 may monitor people, such as person 942, standing near display 956 and select advertisements for display 956 according to attributes of the people. For example, advertisements directed to a child audience may be displayed when device 954 identifies a large percentage of children in the images acquired by device 120. Alternatively to being directed at a location from which display 956 is viewed, cameras 122,128 may view an entrance to a shop or other closed area in which display 956 displays advertisements or other information. The advertisements displayed are optionally selected according to the average profile of people entering the shop.

In some embodiments of the invention, the advertisements are selected responsive to behavior against rules identified in the images of device 120. For example, when a camera monitoring a printer at a work place identifies misuse of the printer it may show on display 956 a warning and/or use instructions.

Device 120 is stationary, in some embodiments. In other embodiments of the invention. Device 120 is a portable camera, possibly mounted on a mobile communication terminal. In these embodiments, display 956 is optionally the display of the mobile terminal. Alternatively, display 956 is separate from the mobile terminal, which periodically transmits information selection instructions to the display. In some embodiments of the invention, Device 120 stores the selected information until the mobile terminal is connected to a base computer. Device 120 may also be mounted on home and/or office appliances, such as refrigerators.

In some embodiments of the invention, the images from device 120 are additionally provided to a monitoring station 950. Thus, device 120 is used for two different tasks and the cost of camera hardware is reduced. In some embodiments of the invention, installation of system 940 is financed by the advertisements.

Figure 16:
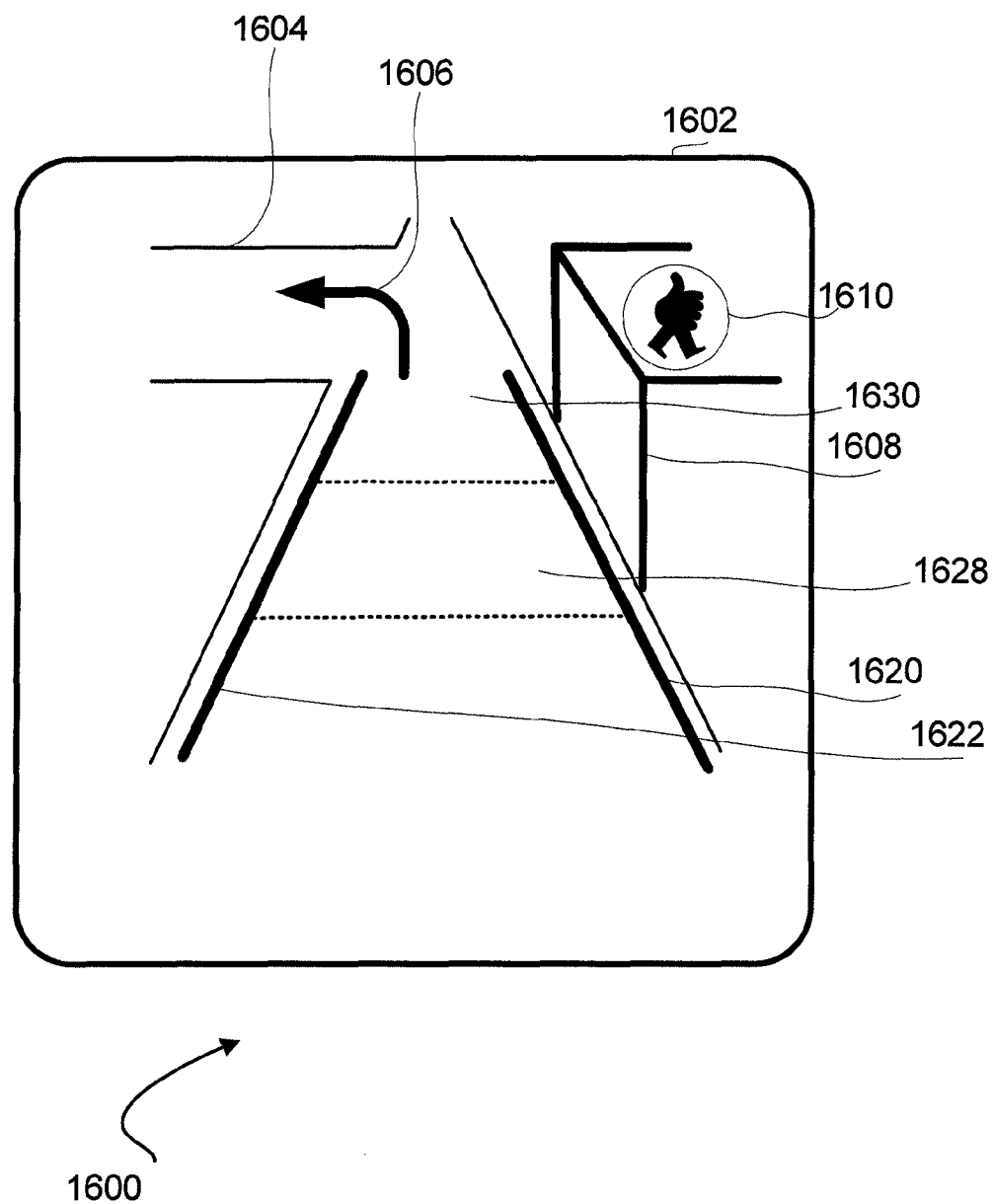
FIG. 16 is a schematic illustration of an information display system 1600, in accordance with an exemplary embodiment of the invention.

FIG. 16 is a schematic illustration of an information display system 1600, in accordance with an exemplary embodiment of the invention. Item 1602 is a display of device 120. It shows a street view captured by camera 122, and the view is comprised of a road 1604. Device 120 may run or receive navigation instructions from navigation software that produces navigation instructions. The system displays the graphic navigation instructions 1606 on display 1602. For example, a navigation system such as Waze may run on device 120. Its API gives the navigation instruction "turn left in 50 meters" and the system displays a left turn at the intersection on display 1602. Instructions 1606 may be presented as semitransparent graphics or even presented on a head up display on the front window.

If the street view includes a business 1608, then the user can press the "like" button 1610 to indicate he likes this place. Alternatively, a "like" button can pop up once a user gets nearby 1608 (using GPS) to let the user indicate he likes 1608. The individual likes may be collected from multiple users and presented on a map 1240 such as described in FIG. 12. For example, the likes could create a heat map of the hottest regions in town, or a report on the most liked business(es) in town. Individual likes can be classified to a specific business using their GPS coordinates or matching them using visual similarity of their images. The aggregates information may indicate that businesses of specific visual attribute are liked more, such as businesses with the color red. Furthermore, the like indication may be: created actively by the user pressing the like button; solicited by prompting a like button near the image of the object in case the object is detected using content match; created by a user's behavior, such as stopping by a shop in case device 120 is carried by person 236 or body part 237, and/or by parking in case carried by vehicle 110.

In some embodiments of the invention, the driving lane is detected and marked on the display using marking such as 1620 and 1622. Marked lane could be divided into sub areas such as 1628 and 1630 wherein each area represents a range of different risk and can be further identified using a color code such as green for a safe zone, yellow for a risky zone, and red for a danger zone.

Figure 17:
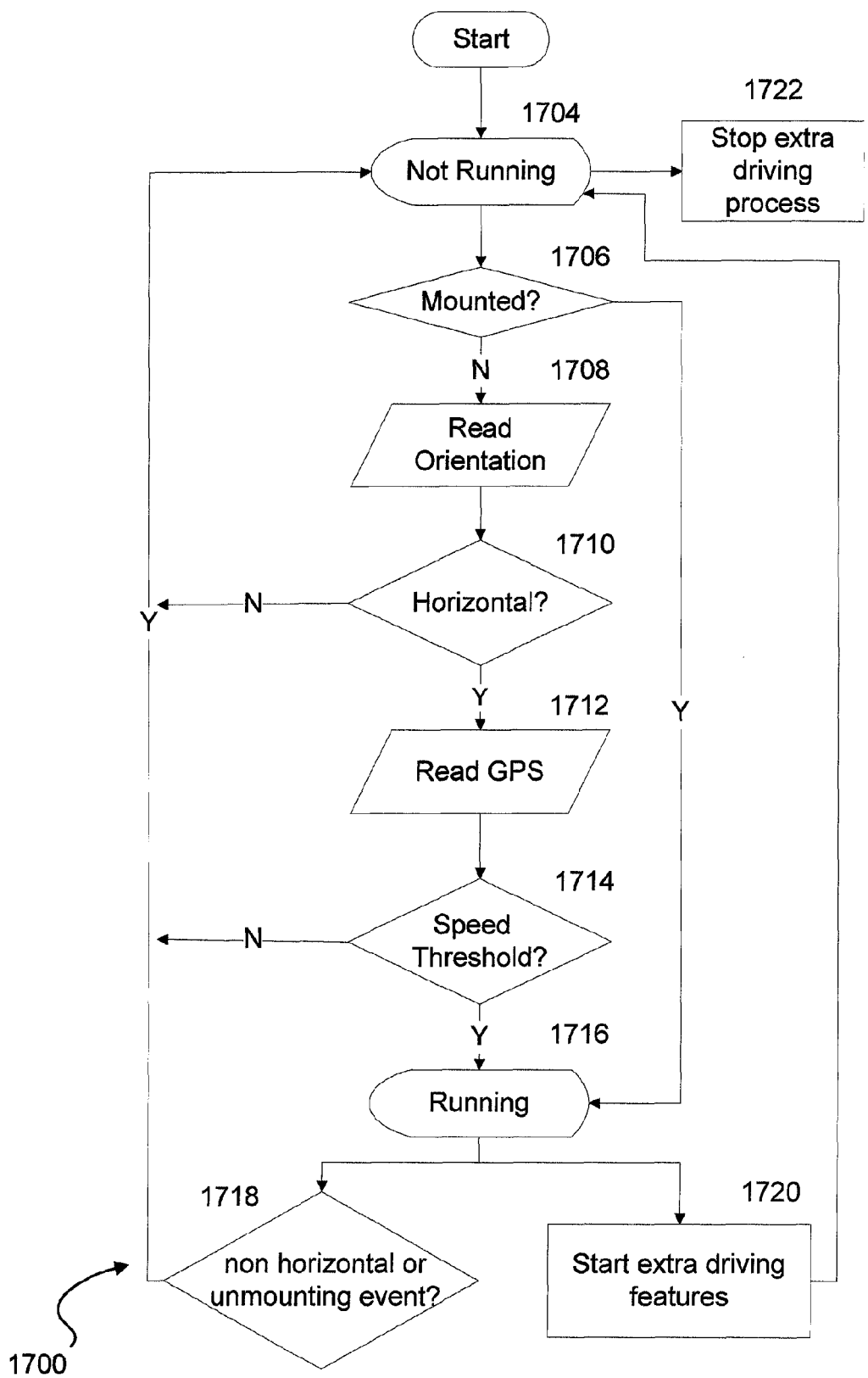
FIG. 17 is a flowchart of acts performed in accordance with an exemplary embodiment of the invention.

FIG. 17 is a flowchart of acts performed in accordance with an exemplary embodiment of the invention. System 1700 is used to run the process such as the one described on FIG. 5. System 1700 can therefore run in a similar manner to an anti-virus program. For example, it can run in the background and launch the program described in FIG. 5 only when vehicle 110 is driving and 120 is on a vehicle mount. The program of FIG. 5 can then run in the background and show no alerts unless an event such as a collision warning needs to be displayed, or run in the foreground and continuously display information.

By default the system indicates if it is not running on a display 1602. In some cases vehicle mounts such as 452 establishes an electrical connection with device 120, or a metal detection sensor of 120 can indicate it presence. In either case that will indicate mounting 1706 and the user will be presented with an indication the system is running 1716.

In case the mounting has not been detected 1706, then device 120's orientation is read 1708 using sensors 124 and 126. Usually when device 120 is mounted on its vehicle mount it will be on close to 90 degrees to the earth and will stay relatively close to that position for a while. So in case such horizontality is detected in step 1710, then the GPS location is read in step 1712. This step consumes a relatively greater amount of energy than 1708 thus performing it only after horizontality is achieved saves energy. If horizontality is not detected in step 1710, then step 1704 is performed. Reading the GPS more than once and dividing the distance traveled by the time passed results in the relative speed at which 120 and hence 110 are traveling. In case the relative speed is above a threshold in step 1714, such as 20 KM/H or 30 KM/H, then step 1716 is performed. If not, then step 1704 is performed. On step 1716 the user will be presented with an indication the system is running. Subsequent to that in case of non-horizontal position or un-mounting event (the opposite of 1706) is detected in step 1718, then step 1704 is performed. Optionally system 1700 is used to collect information on a driver's behavior only while driving. In this case the orientation indication of steps such as 1708 and 1718 may not be required. Also following step 1716 is step 1720 in which extra driving features are activated. When the system stops running, such as on step 1704, extra driving features also stop running as on step 1722.

Figure 18:
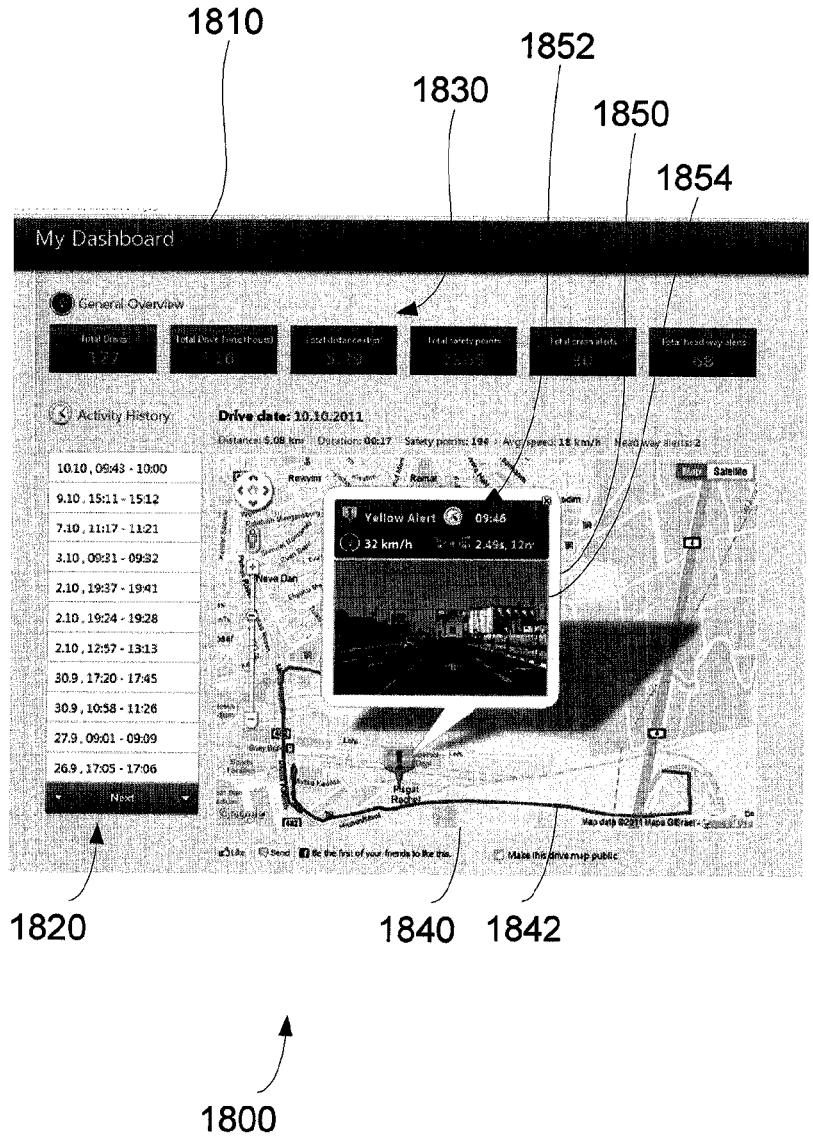
FIG. 18 is a scheme describing a system and process in accordance with an exemplary embodiment of the invention.

FIG. 18 is a scheme describing a system and process in accordance with an exemplary embodiment of the invention for creating a report. Report 1800 is similar to the report described in 1260 of FIG. 12. The report is collected using devices such as 120 and is comprised of: 1810 a dashboard; 1820 a list of routes; 1830 a list of parameters such as total drives, total drive time, total stop time, total safety points, total crash alerts, and total headway alerts; and, 1840 a map. The map 1840 is comprised of: a) 1842 route marking, wherein a color code can be used to indicate the driving speed/risk at each part of the route; and, b) 1850 a snapshot frame comprised of: i) 1852 a snapshot data such as alert type, speed, time gap to the vehicle in front, and weather conditions; and, ii) 1854 a snapshot captured by camera 122.

Optionally the report 1800 may also display local geographic related data such as: tax policy; weather; road potential hazards; local traffic; other drivers safety scores and safety points; last parking place image (as described in FIG. 19); and available parking locations (as described in FIG. 10).

Figure 19:
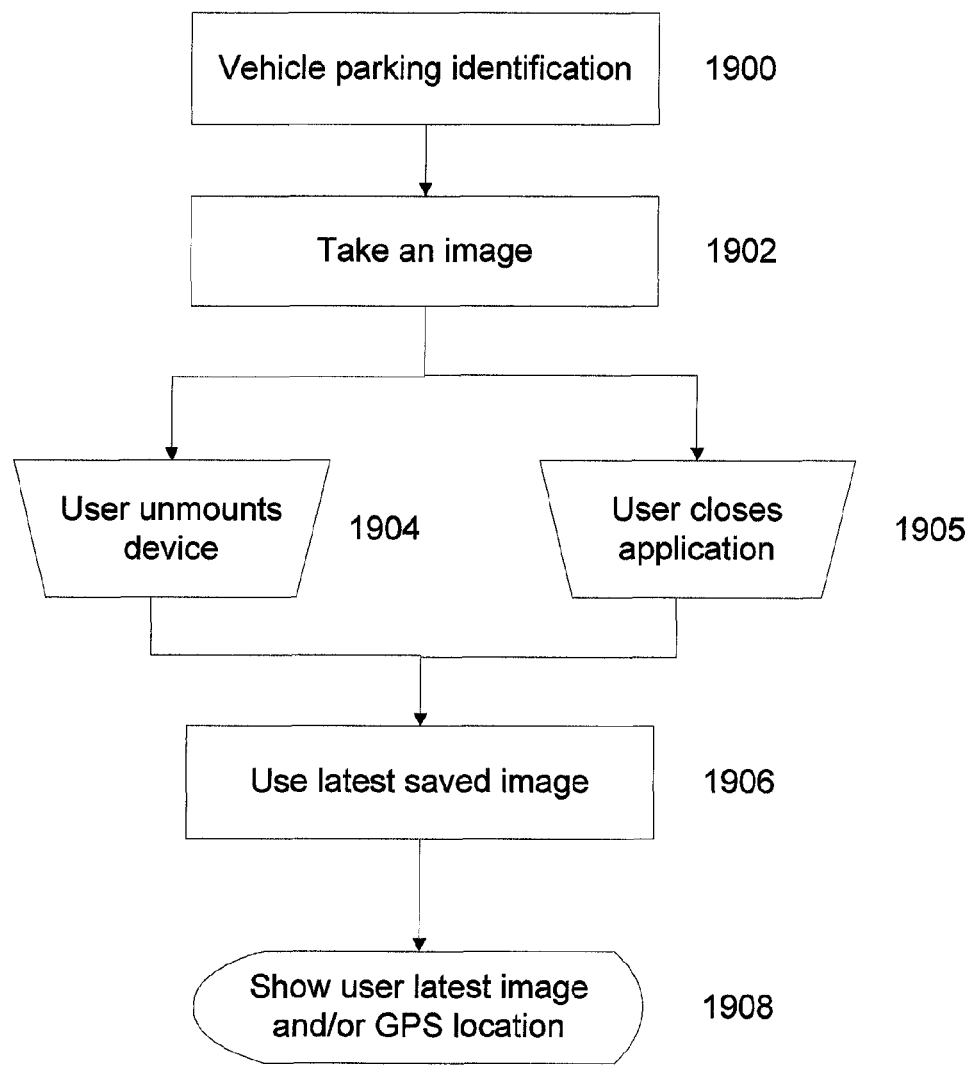
FIG. 19 is a flowchart of acts performed in accordance with an exemplary embodiment of the invention.

FIG. 19 is a flowchart of acts performed in accordance with an exemplary embodiment of the invention. The process described is a visual vehicle locating system. On step 1900 a vehicle's stop is identified and its GPS location is saved, followed by step 1902 in which an image of a parking location is taken periodically. When user unmounts mobile phone 1904 or manually closes application in step 1905, the latest saved parking location image is used on step 1906 and displayed to the user on step 1908 with the vehicle's GPS location and/or with directions to his/her vehicle.

Figure 20:
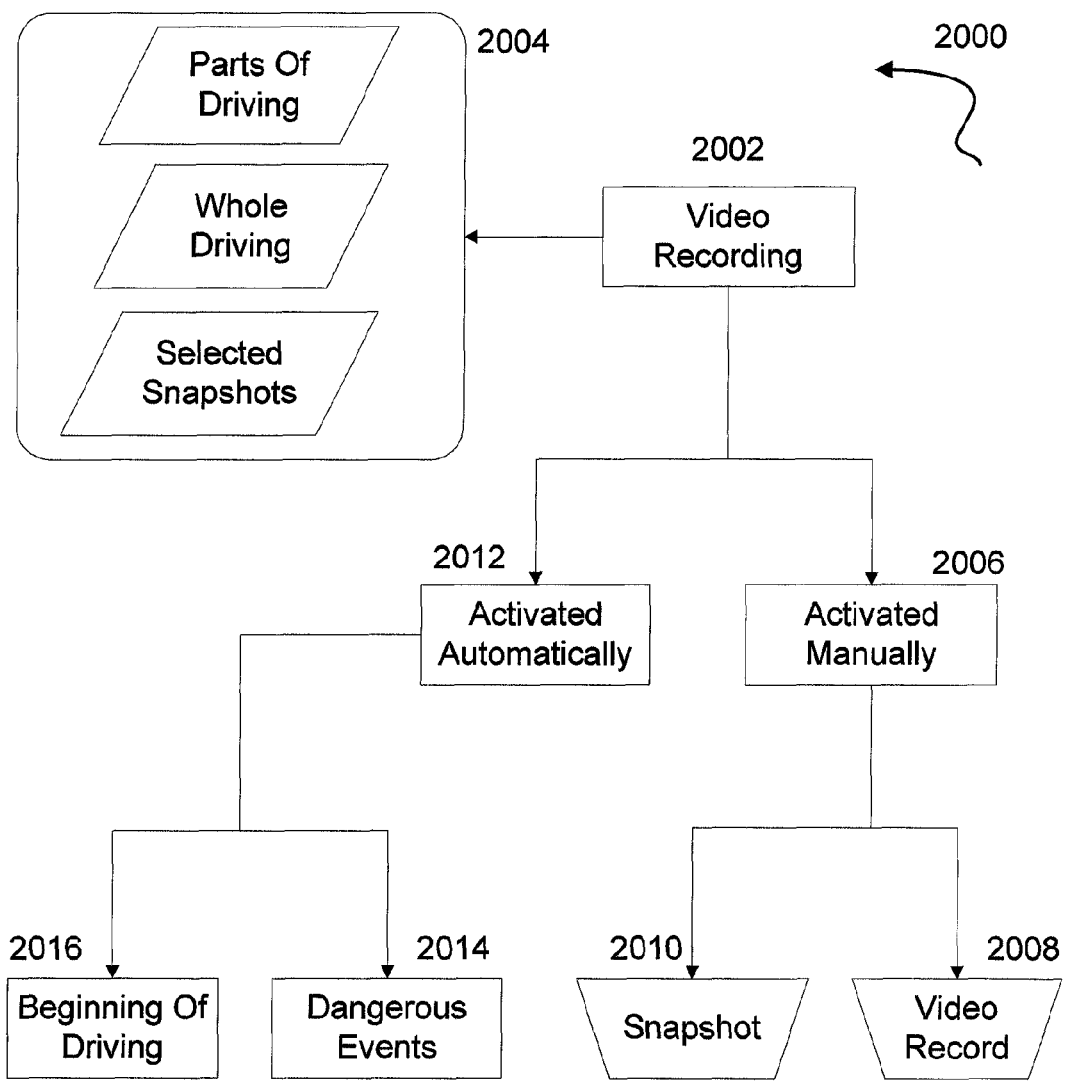
FIG. 20 is a flowchart of acts performed in accordance with an exemplary embodiment of the invention.

FIG. 20 is a flowchart of acts performed in accordance with an exemplary embodiment of the invention. The process described is dangerous events recording. System 2000 records videos 2002 of driving 2004. The system can record the whole driving, parts of it, or selected snapshots. System 2000 can be activated manually 2006, in which the driver chooses between a video record button 2008, or a snapshot button 2010. Alternatively, system 2000 can be activated automatically 2012 while dangerous events occur 2014, or from the beginning of the driving session 2016. Dangerous events 2014 may manifest in collision alerts, maintaining distance alerts, lane deviation, incorrect in-lane location, potential hazards according to data collected by accelerometer, and other potential dangerous data regarding driver behavior as mention in FIG. 12.

Figure 21:
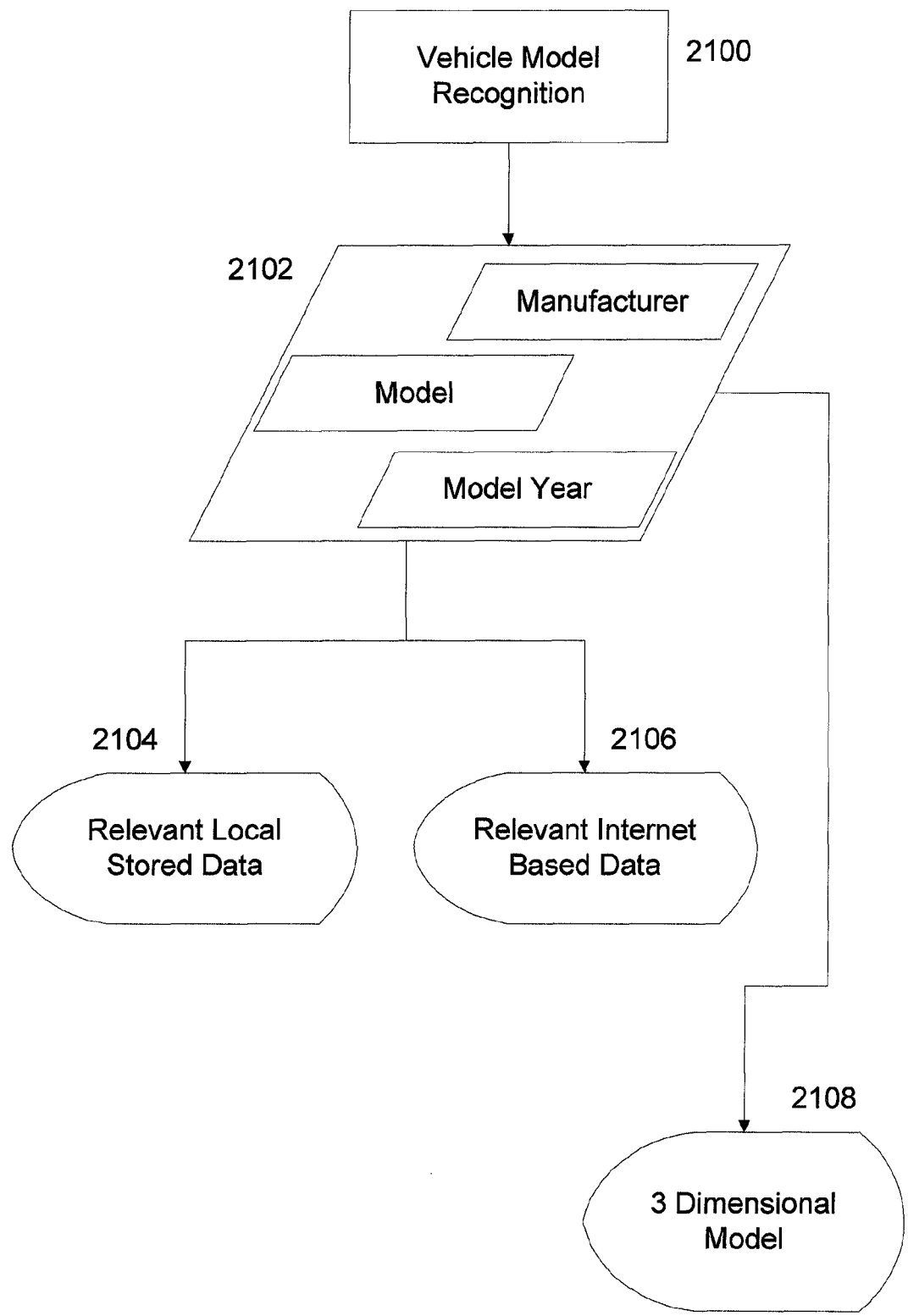
FIG. 21 is a flowchart of acts performed in accordance with an exemplary embodiment of the invention.

FIG. 21 is a flowchart of acts performed in accordance with an exemplary embodiment of the invention. The process described is vehicle model recognition. System 490 (see FIG. 4) processes images taken by camera 122, and by using steps such as the ones described in FIG. 5, wherein the system 490 recognizes vehicle model 2100 according to data 2102 (e.g. manufacturer and/or model and/or model year). System 490 subsequently displays relevant local stored data 2104 or relevant Internet based data 2106 regarding the vehicle recognized (e.g., customer reviews, Wikipedia values, eBay deals, etc.). Optionally, system 490 may also display a three dimensional model of the vehicle recognized 2108.

Figure 22:
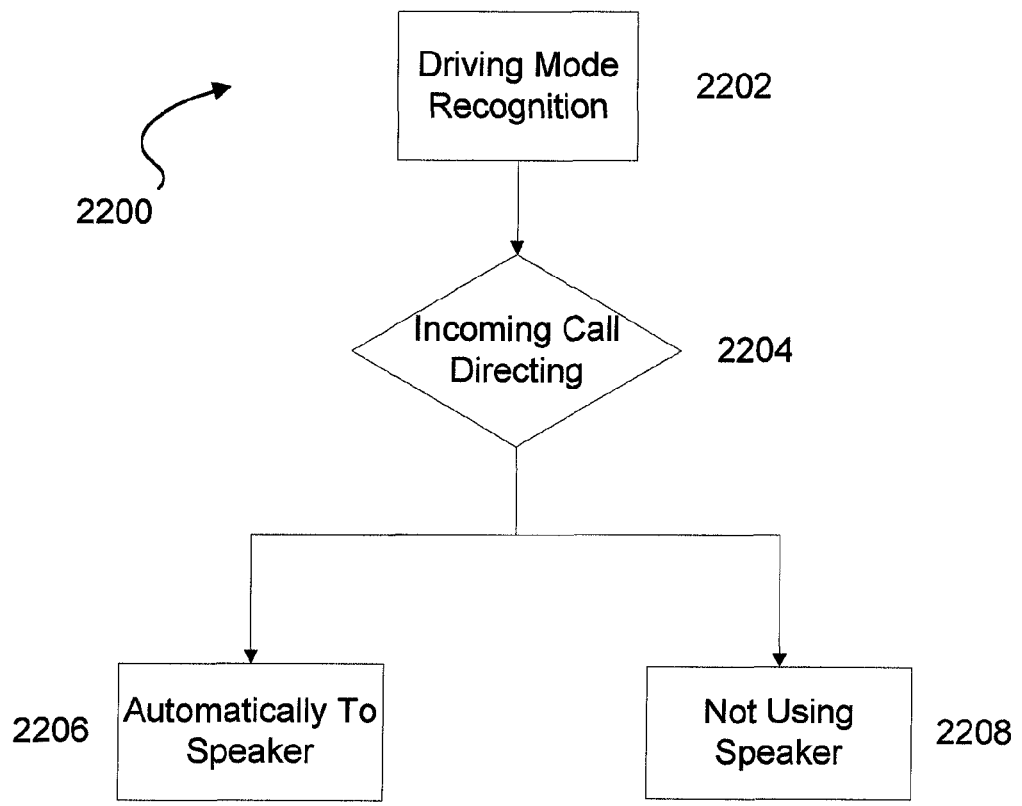
FIG. 22 is a flowchart of acts performed in accordance with an exemplary embodiment of the invention.

FIG. 22 is a flowchart of acts performed in accordance with an exemplary embodiment of the invention. The flowchart describes incoming calls directing to a speaker while driving. System 2200 recognizes driving mode 2202 by using steps such as the ones described in FIG. 17. The driver can choose 2204 whether to automatically direct all incoming calls to a speaker while driving 2206, or to answer the incoming calls without a speaker 2208. When the driving mode is detected, all incoming calls will automatically be directed to driver's predefined choice.

Figure 23:
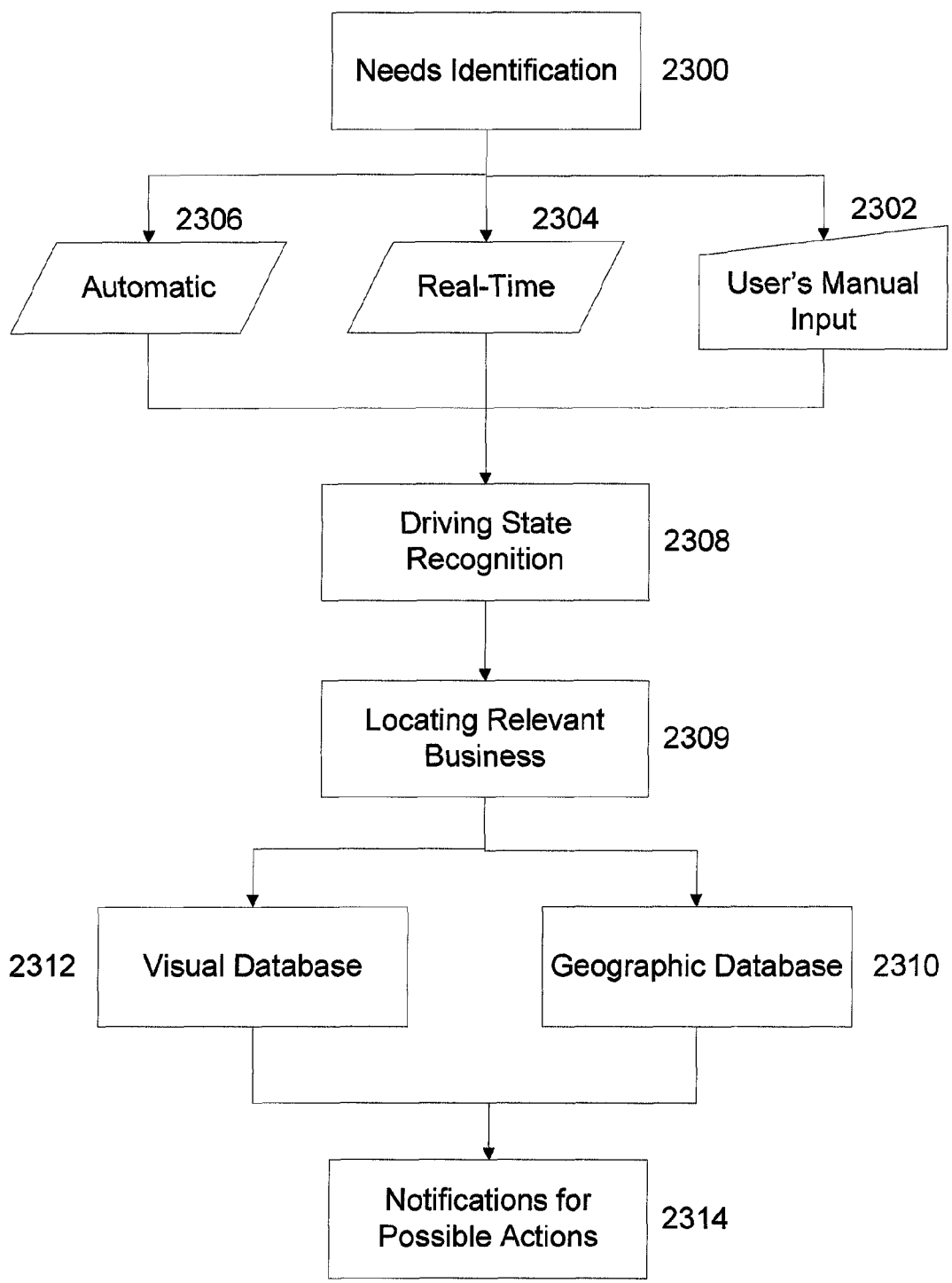
FIG. 23 is a flowchart of acts performed in accordance with an exemplary embodiment of the invention.

FIG. 23 is a flowchart of acts performed in accordance with an exemplary embodiment of the invention. The flowchart describes a location based and/or image based notification system which notifies the driver about actions that can be performed on a geographical nearby place. The user's needs are identified 2300 by three integrated data layers: a) manual input 2302; b) real-time in-vehicle systems 2304; and c) automatic pattern recognition 2306 based on external database and/or re-occurring driving routes. When the driving state is recognized 2308, then the system locates relevant business places 2309 which may include but are not limited to banks, gas stations, grocery stores etc.. This is done by linking to one or both of: a geographic based database 2310; and/or a visual based database 2312 using the visual recognition process as described in FIG. 8. Then the system cross-checks with recognized needs. If a match is found within a predefined distance from a driver's location, then the driver receives a notification 2314 for possible nearby action(s) he may perform.

Examples for each data layer as mentioned in steps 2302, 2304, and 2306 are as follows. In the first example, the user manually inputs a task such as buying milk. While the user is driving, the system detects nearby grocery stores by using a geographic database and/or visual recognition. In case a grocery store is detected within a predefined distance, then the driver receives a notification for the possibility of buying milk in this store.

In the second example, the system integrates in real-time with in-vehicle systems such as fuel consumption. When the fuel level is low, the system detects nearby gas stations by using a geographic database and/or visual recognition. In case a gas station is detected within a predefined distance, the driver receives a notification for the possibility of refueling in this gas station.

In the third example, the system integrates with external systems' databases such as credit card billings, and automatically identifies re-occurring actions such as buying milk every seven days. On every seventh day while driving, the system detects nearby grocery stores by using a geographic database and/or visual recognition. In case a grocery store is detected within a predefined distance, the driver receives a notification for the possibility of buying milk in this store.

In the fourth example, the system automatically identifies driving patterns from past driving routes. In case the system recognizes a re-occurring driving route, such as one which involved a stop the last time, then the driver will receive a notification for a stop at the same location as the last time.

Figure 24:
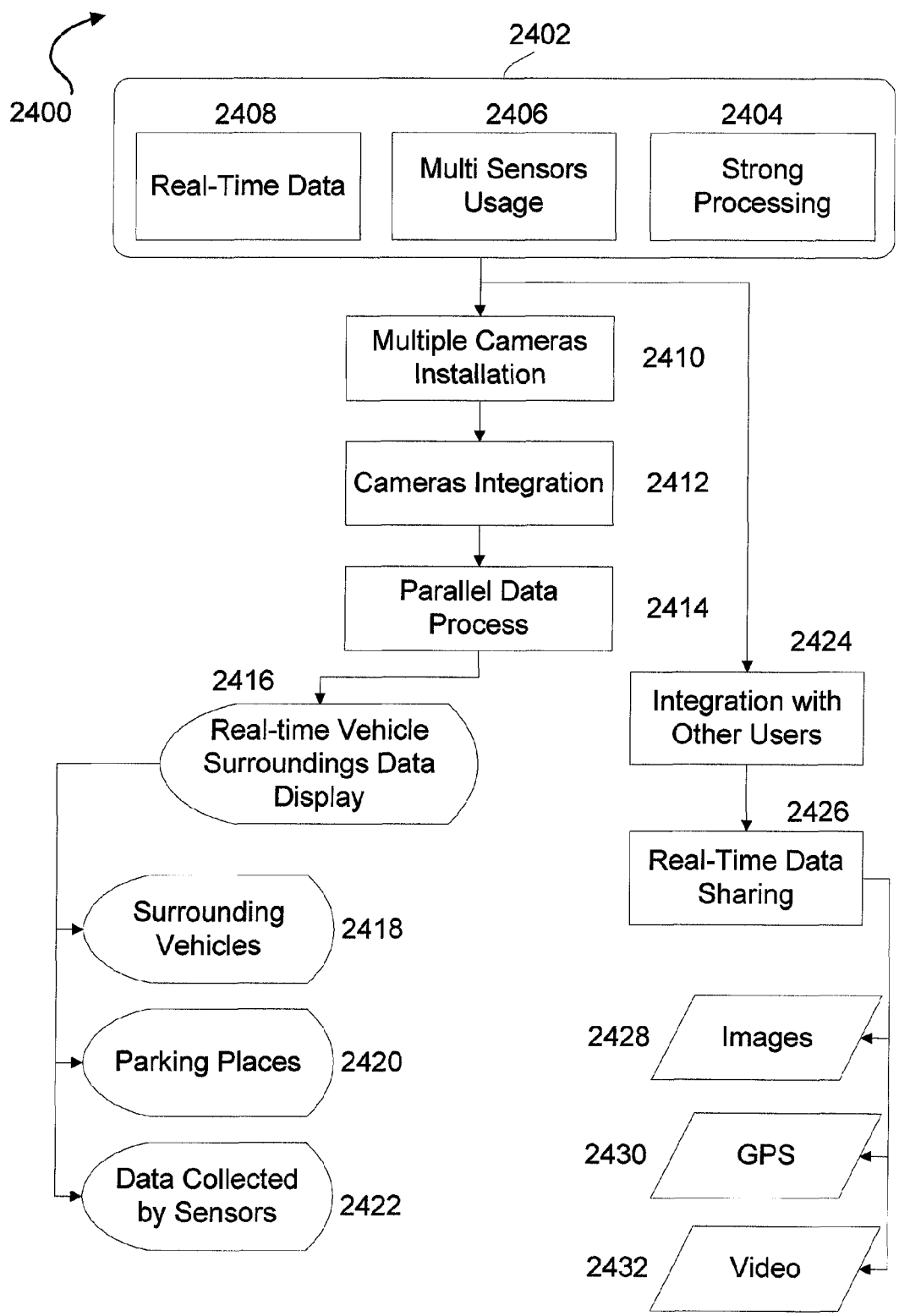
FIG. 24 is a flowchart of acts performed in accordance with an exemplary embodiment of the invention.

FIG. 24 is a flowchart of acts performed in accordance with an exemplary embodiment of the invention. The flowchart describes data sharing processes by using multiple vehicle sensors. System 2400 uses platform based on high bandwidth data sharing and parallel processing between base bands 2402. The platform enables strong processing power 2404 and multi sensors usage 2406. The platform also prevents delay in data 2408 due to its usage of a local database (instead of using cloud servers). Multiple wireless network based cameras 2410 are installed in the vehicle as described in FIG. 4A. The platform described in step 2402 enables integration between cameras 2412. As a result of using the platform, the system processes parallel data from multiple sensors simultaneously 2414 and displays real-time multi-angle data 2416 based on vehicle surroundings (i.e. front, rear and side view, as captured in the sensors).

Information displayed includes but is not limited to items 2418, 2420, and 2422 in FIG. 24. Items 2418 comprise: a) information about vehicles around the driver 2418 (from every possible angle that the sensors can capture); and, b) relevant data regarding those vehicles, such as: i) the model, year and manufacturer using visual recognition as described in FIG. 21; ii) collision alerts as described in FIG. 20; iii) distance maintenance alerts as described in FIG. 20; and, iv) road lanes information as describe in FIG. 8. Items also comprise: c) information about available parking places 2420 on both lanes as described in FIG. 10; and, d) further data collected by sensors 2422 as described in FIG. 8 such as: road signs; pedestrians; road hazards; potential road hazards, etc.

The platform also enables the system to integrate with other drivers 2424 who are using the same system within a predefined range. As a result, data collected by other drivers' sensors is shared as described in FIG. 25, and each user receives real-time information 2426 from every possible source and tune. Optionally, the user may receive data from a distance as long as there is a continuing connection between the users in a predefined range. Examples for real-time data sharing between users comprises: a) captured images 2428 (e.g., accidents, traffic, road hazards, road signs, and business places); b) GPS data 2430; and, c) video sharing 2432.

Figure 25:
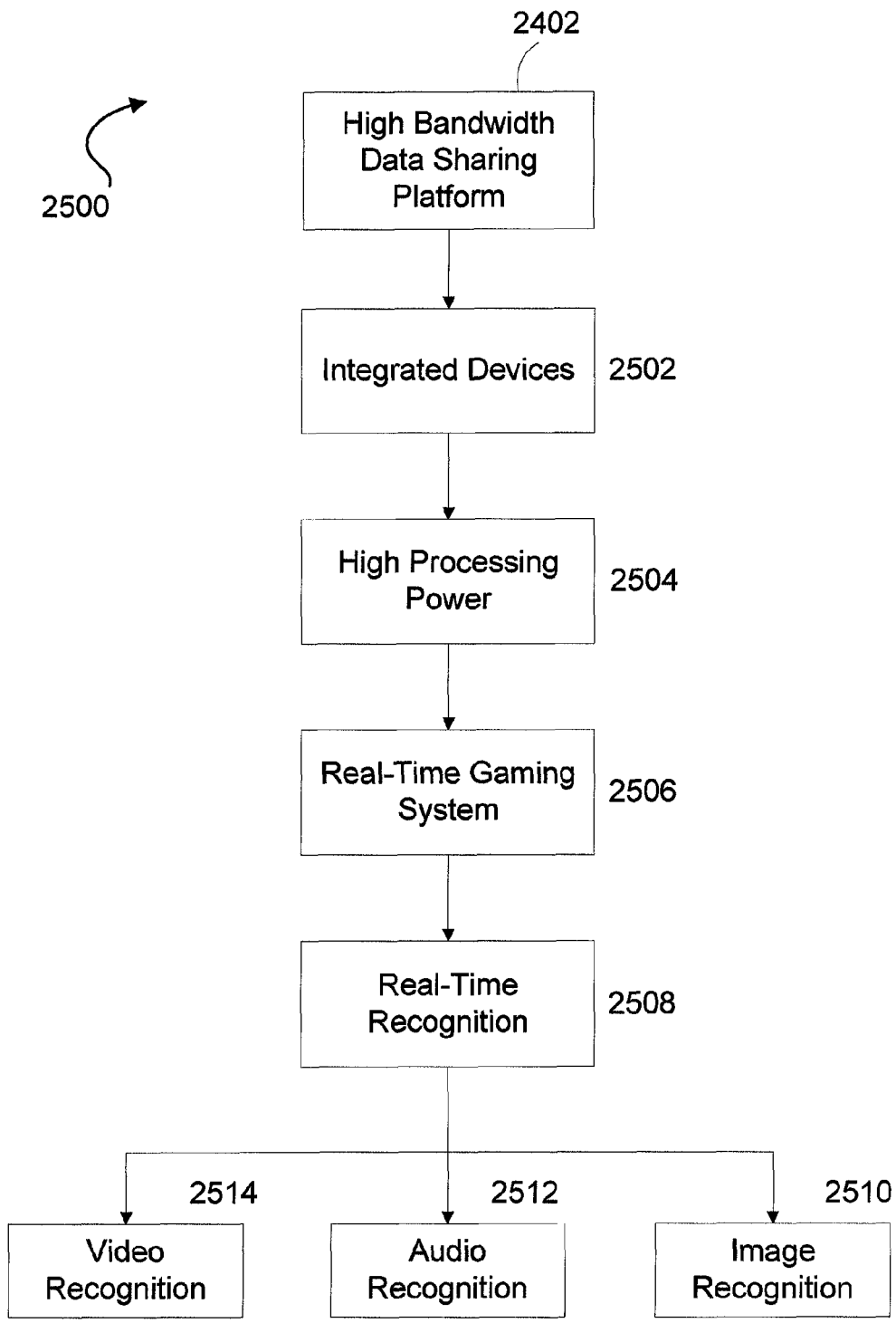
FIG. 25 is a flowchart of acts performed in accordance with an exemplary embodiment of the invention.

FIG. 25 is a flowchart of acts performed in accordance with an exemplary embodiment of the invention. The flowchart describes data sharing processes which enables a shared gaming system. System 2500 which uses platform 2402 as described in FIG. 24 enables real-time data sharing between integrated devices 2502. The computing process may use all integrated devices within a predefined wireless network range, thus achieving high processing ability 2504. As a result a real-time gaming system 2506 can be shared between integrated devices within a predefined distance, due to a platform's ability to parallel process using multiple sensors and real-time video data sharing.

The shared gaming system is based on real time recognition 2508 comprising real-time image recognition 2510, audio recognition 2512, and video recognition 2514. Examples for image recognition 2510 are as follows: Faces; Routes; Road signs; Places; Vehicles; Objects; and Text. Examples for audio recognition 2512 are as follows: Voices; Sounds; and Songs. And examples for video recognition 2514 are as follows: Music videos such as in music channels; Movies; and Television series.

Figure 26:
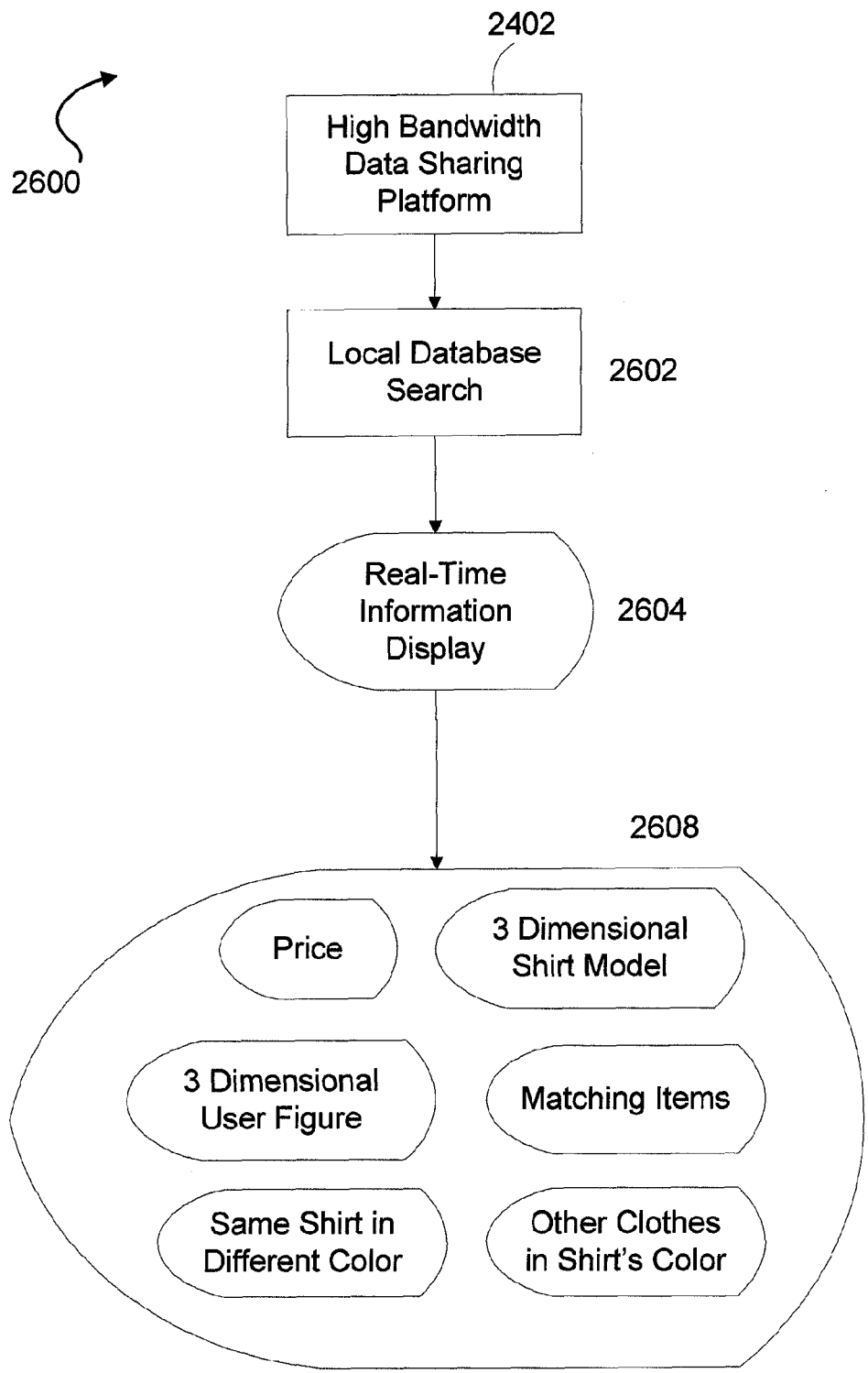
FIG. 26 is a flowchart of acts performed in accordance with an exemplary embodiment of the invention.

FIG. 26 is a flowchart of acts performed in accordance with an exemplary embodiment of the invention. The flowchart describes a data sharing process from local databases. System 2600 which uses platform 2402 as described in FIG. 24 may search data on a local database 2602 and display real-time information 2604. For example: a user walks into a clothing store, tunes device in front of a shirt and receives a variety of real-time data 2608 extracted from the store's database regarding the shirt. The extracted data displayed may include but is not limited to: price; a three dimensional model of the shirt; a three dimensional figure of a user wearing the shirt; matching items (e.g. accessories; shoes; and other clothes); images of the same shirt in different colors; and other clothes in the shirt's color.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire- line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A handheld device comprising,
    at least one camera;
    a display;
    at least two sensors;
    a housing comprising said at least one camera, said housing being sized and shaped for mounting and detachment within an interior of a vehicle passenger compartment;
    wherein said at least one camera and a first sensor of said at least two sensors simultaneously record a first plurality of images of an external environment outside of a vehicle and at least one signal of an internal passenger compartment environment inside of the vehicle;
    wherein said first plurality of images comprises at least one of a plurality of snapshots and a plurality of videos;
    a computer readable medium containing computer executable instructions; and
    a processor adapted to execute said computer executable instructions for:
        identifying a deviation from a predefined driving direction by an analysis of said first plurality of images;
        identifying a signal recorded in said vehicle internal passenger compartment by a second sensor of said at least two sensors after said identifying said deviation;
        analyzing said deviation and said signal to identify a reaction of a driver of said vehicle to said deviation in real time; and
        instructing said display to present an alert according to said analyzing.

2. The handheld device of claim 1, further comprising a database to store said first plurality of images, said at least one signal and results of said analyzing, wherein the database is located on the device or on a remote system server.

3. The handheld device of claim 1, wherein said display plays audio results of said analyzing.

4. The handheld device of claim 1, wherein said computer readable medium is an application executed on said handheld device.

5. The handheld device of claim 1, wherein said instructions comprise instructions for graphically displaying driving instructions projected inside said vehicle, wherein said driving instructions depict street lane markings and directional arrows.

6. The handheld device of claim 5, further comprising said driving instructions depicting businesses in proximity to said street lane markings; wherein said display comprises means for a user to indicate their preference for a business.

7. The handheld device of claim 6, wherein said display presents multiple users' preferences on a map.

8. The handheld device of claim 1, further comprising a module which detects when said housing is mounted within said vehicle; wherein said at least one camera and said first sensor are instructed to perform said simultaneous recording in response to said detecting.

9. The handheld device of claim 1, wherein said computer readable medium comprises instructions for generating a report comprising results of said analyzing, wherein said generating comprises analyzing said first plurality of images and said at least one signal to calculate parameters selected from a group consisting of: drive times, stop times, safety points, crash alerts, headway alerts, and lane departures;
    generating said report according to said parameters; and presenting said report using said display;
    wherein said report comprises: a color coded map marking a driving route and information extracted from said parameters.

10. The handheld device of claim 4, wherein said computer readable medium comprises:
    instructions for analyzing said first plurality of images and said at least one signal to determine when said vehicle has parked;
    instructions for recording at least one of said first plurality of images to image the vehicle's parking location; and
    instructions for displaying said at least one of said first plurality of images on said handheld device.

11. The handheld device of claim 1, wherein said analysis of said first plurality of images determines when at least one dangerous event for said vehicle occurs;
    wherein said at least one dangerous event is a member of a group consisting of at least collision, maintaining distance, lane deviation, incorrect in-lane location, and potential hazards.

12. The handheld device of claim 11, wherein said display presents an alert in response to a detection of said at least one dangerous event.

13. The handheld device of claim 1, wherein said processor applies said analyzing on both said first plurality of images and said at least one signal to detect driving; wherein said computer readable medium contains computer executable instructions to direct incoming phone calls based on said driving detection.

14. The handheld device of claim 1, wherein said computer readable medium contains computer executable instructions for:
    identifying a driver's needs based on driver manual input, real-time in-vehicle data, and automatic pattern recognition data;
    recognizing the driver's geographic location;
    determining a plurality of local businesses within a pre-designated range matching said driver's needs, wherein locations are derived from a visual database and/or a geographic database; and
    notifying the driver of the match between said plurality of local businesses and the driver's needs.

15. The handheld device of claim 14, wherein said identifying comprises acquiring real-time vehicle fluid level and calculating said driver's needs according to said vehicle fluid; wherein said plurality of businesses comprises a plurality of gas stations.

16. The handheld device of claim 14, wherein said recognizing comprises identifying a routine driving stop of said vehicle, and notifying the driver about said routine driving stop.

17. The handheld device of claim 14, wherein said recognizing comprises notifying the driver of a possible purchase from a local business.

18. The handheld device of claim 1, wherein said first plurality of images is captured to image multiple viewpoints around a vehicle exterior of said vehicle.

19. The handheld device of claim 1, wherein said analysis of said first plurality of images comprises an analysis to extract information about vehicles around the driver based on image processing.

20. The handheld device of claim 1, further comprising a unit which wirelessly transmits results of said analyzing to surrounding vehicles.

21. The handheld device of claim 20, wherein said analyzing comprises real-time image, audio, and video recognition, wherein:
    said image recognition comprises a recognition of a member selected from a group consisting of faces, traveling routes and places, road signs, surrounding vehicles, objects and text;
    said audio recognition comprises a recognition of a member selected from a group consisting of voices, sounds, and songs; and,
    said video recognition comprises a recognition of a member selected from a group consisting of music channels, movies, and television series.

22. The handheld device of claim 1, wherein said analyzing comprises a calculation of a normalized driving scoring of said driver.

23. The handheld device of claim 1, wherein said deviation is from a middle of a lane, wherein said second sensor is a microphone, and wherein said signal is an audio signal of an activated turn blinker signaling a turn.

24. A computerized image processing method, comprising,
    using at least one camera and at least a first sensor to record simultaneously a first plurality of images of an external environment outside of a vehicle and at least one signal of an internal passenger compartment environment inside of said vehicle;
    identifying, using a processor, a deviation from a predefined driving direction by an analysis of;
    identifying, using said processor, a signal recorded in said vehicle internal passenger compartment by at least a second, different sensor after said identifying said deviation;
    analyzing, using said processor, said deviation and said signal to identify a reaction of a driver of said vehicle to said deviation in real time; and,
    instructing a display to present an alert according to said analyzing.

* * * * *